United States Patent
Hirose et al.

(10) Patent No.: US 7,476,464 B2
(45) Date of Patent: Jan. 13, 2009

(54) NEGATIVE ELECTRODE AND SECONDARY CELL

(75) Inventors: Takakazu Hirose, Fukushima (JP);
Masayuki Iwama, Fukushima (JP);
Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/828,151

(22) Filed: Jul. 25, 2007

(65) Prior Publication Data
US 2008/0050652 A1     Feb. 28, 2008

(30) Foreign Application Priority Data
Aug. 2, 2006     (JP)     ............ P2006-210791

(51) Int. Cl.
*H01M 4/38* (2006.01)
*H01M 10/40* (2006.01)

(52) U.S. Cl. .............. 429/200; 429/199; 429/209; 429/218.1

(58) Field of Classification Search .......... 429/200, 429/199, 209, 218.1
See application file for complete search history.

(56) References Cited

U.S. PATENT DOCUMENTS 4,977,046 A * 12/1990 Bleszinski et al. .......... 429/224
2005/0221189 A1 * 10/2005 Yoshida et al. ............ 429/231.95
2006/0024588 A1 * 2/2006 Jito et al. ................. 429/344
2006/0043862 A1 * 3/2006 Kang ...................... 313/311
2006/0099507 A1 * 5/2006 Kogetsu et al. ............ 429/218.1

FOREIGN PATENT DOCUMENTS

| EP | 1018773 A1 * | 7/2000 |
| JP | 08-050922 | 2/1996 |
| JP | 11-135115 | 5/1999 |
| JP | 2948205 | 7/1999 |
| JP | 2002-083594 | * 3/2002 |

* cited by examiner

*Primary Examiner*—Patrick Ryan
*Assistant Examiner*—Angela J. Martin
(74) *Attorney, Agent, or Firm*—Bell, Boyd & Lloyd LLP

(57) ABSTRACT

A negative electrode wherein a negative electrode current collector has a conductive foil including a conductive substrate and a multiplicity of conductive lumpy projections provided at a surface of the substrate is provided. The multiplicity of lumpy projections are so disposed that a plurality of the lumpy projections are aligned substantially in one direction to form a lumpy projection row and that a plurality of the lumpy projection rows are arrayed side by side at a predetermined interval in a direction substantially orthogonal to the one direction.

16 Claims, 8 Drawing Sheets

ELECTROLYTIC COPPER FOIL

ROW DIRECTION = DIRECTION IN WHICH LUMPY PROJECTIONS ARE ALIGNED IN ONE LUMPY PROJECTION ROW (CORRESPONDING TO THE ABOVE-MENTIONED DIRECTION)

ARRAY DIRECTION = DIRECTION IN WHICH A PLURALITY OF LUMPY PROJECTION ROWS ARE ARRAYED SIDE BY SIDE (DIRECTION IN WHICH ELECTROLYTIC COPPER FOIL EXTENDS)

SILICON LAYER

MOST PREFERABLE EXAMPLE OF ROLLING

ROLL AXIS DIRECTION = ARRAY DIRECTION OF LUMPY PROJECTION ROWS (DIRECTION IN WHICH ELECTROLYTIC COPPER FOIL EXTENDS)

LEAST PREFERABLE EXAMPLE OF ROLLING

ROLL AXIS DIRECTION

ARRAY DIRECTION OF LUMPY PROJECTION ROWS (DIRECTION IN WHICH ELECTROLYTIC COPPER FOIL EXTENDS)

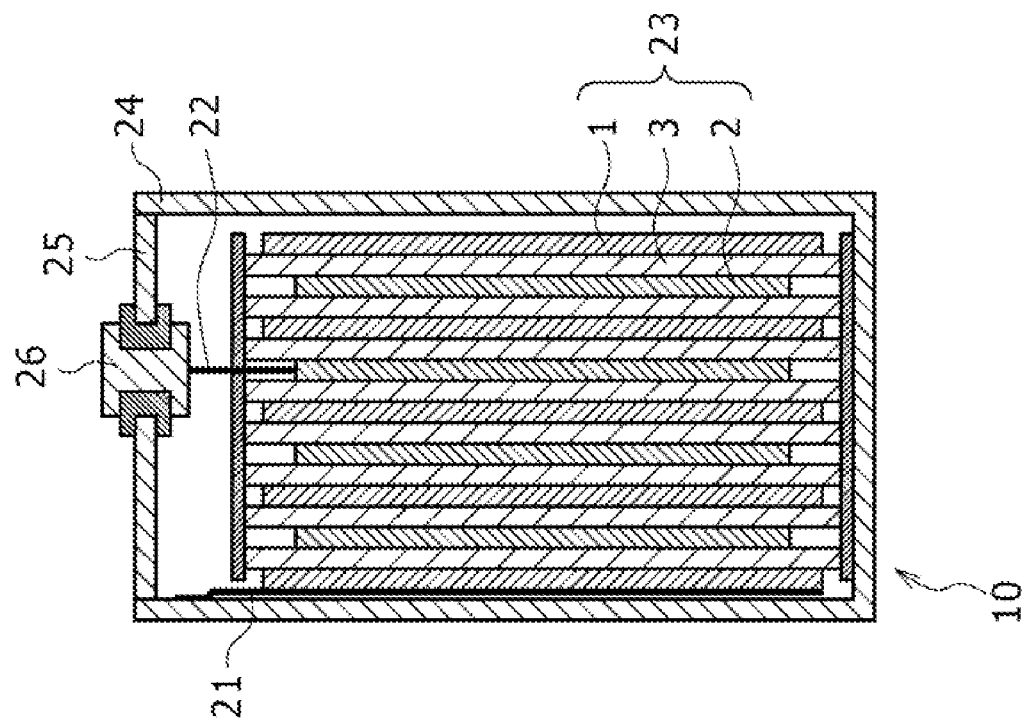
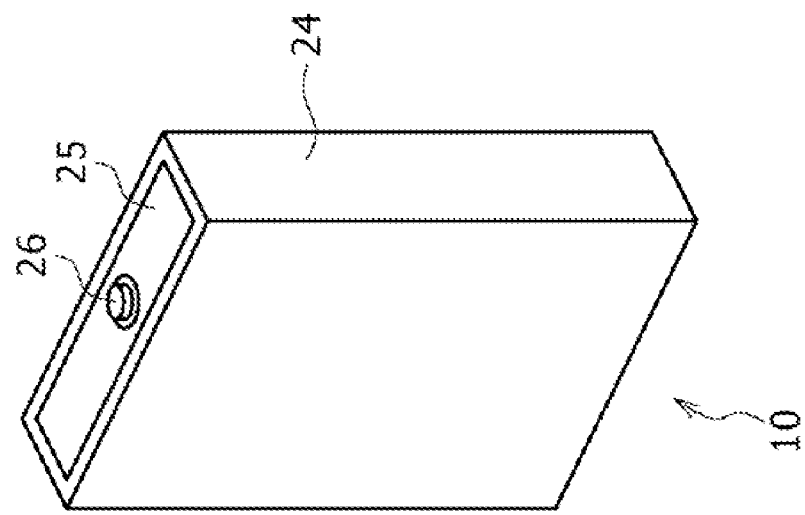

ELECTROLYTIC COPPER FOIL

SILICON LAYER

NEGATIVE ELECTRODE AND SECONDARY CELL

CROSS REFERENCES TO RELATED APPLICATIONS

The present application claims priority to Japanese Patent Application JP 2006-210791, filed in the Japan Patent Office on Aug. 2, 2006, the entire contents of which is being incorporated herein by reference.

BACKGROUND

The present application relates to a negative electrode suitable for use in a lithium secondary cell or the like, and to a secondary cell. More particularly, the application relates to improvements in first-time discharge capacity and charge-discharge cycle characteristics of a secondary cell.

In recent years, mobile apparatuses have been being enhanced in performance and in the number of functions. Attendant on these trends, secondary cells for use as power sources in mobile apparatuses are required to be smaller in size, weight and thickness, and are keenly desired to show an enhanced capacity.

As a secondary cell capable of meeting these requirements, there is known the lithium ion secondary cell. The cell characteristics of the lithium ion secondary cells vary greatly depending on the electrode active materials used, and the like. In the representative lithium ion secondary cell put to practical use at present, lithium cobalt oxide is used as the positive electrode active material, and graphite is used as the negative electrode active material. The cell capacity of the lithium ion secondary cell with such a configuration is approaching the theoretical capacity, and it is difficult to largely enhance the capacity by improvements in the future.

In view of this, it is being investigated to realize a considerable enhancement of the capacity of the lithium ion secondary cell by a method in which silicon, tin or the like element capable of alloying with lithium at the time of charging is used as a negative electrode active material. However, where silicon or tin or the like is used as a negative electrode active material, expansion and contraction of the negative electrode active material layer attendant on the charging and discharging will be large. Due to the expansion and contraction attendant on charging and discharging, therefore, the active material may be pulverized or come off the current collector, with the result of a lowering in cycle characteristics.

To solve this problem, negative electrodes have been proposed in recent years in which a negative electrode active material layer of silicon or the like is laminated on a negative electrode current collector (refer to, for example, Japanese Patent Laid-open No. Hei 8-50922, Japanese Patent No. 2948205, and Japanese Patent Laid-open No. Hei 11-135115). It is said that, with such a configuration, the negative electrode active material layer and the negative electrode current collector are firmly bound to each other in integrity, so that the active material can be restrained from being disintegrated due to the expansion and contraction attendant on charging and discharging. In addition, the electronic conductivity in the negative electrode is enhanced effectively.

Besides, Japanese Patent Laid-open No. 2002-83594 (pp. 11 to 13) describes that the negative electrode current collector on which the negative electrode active material layer of silicon or the like is to be laminated is formed from a metal capable of alloying with the negative electrode active material, from the viewpoint of enhanced adhesion to the negative electrode active material. It is also described that in the case of laminating a silicon and germanium layer, copper is particularly preferable for use as the material of the current collector. It is further described that the copper foil for this purpose is preferably an electrolytic copper foil having a high surface roughness Ra. The electrolytic copper foil is a copper foil obtained, for example, by a method in which a metallic drum is immersed in an electrolytic solution containing copper ions, a current is passed in the solution while rotating the drum, to deposit copper on the surface of the drum, and the thus deposited copper film is peeled, to obtain the desired copper foil. The surface(s) of the electrolytic copper foil can be roughened by depositing copper particulates on one side or both sides of the copper foil by an electrolytic process.

However, even in the case of the negative electrode in which the negative electrode active material layer and the negative electrode current collector are integrated and which is produced by a specially contrived method as above-mentioned, repetition of charging and discharging brings about severe expansion and contraction of the negative electrode active material layer, whereby stresses are exerted on the current collector. As a result, the electrode inclusive of the current collector may be deformed or collapsed, making it impossible to obtain sufficient cycle characteristics.

SUMMARY

Thus, there is a need for a negative electrode in which the stress exerted on the current collector at the time of charging is reduced, first-time discharge capacity and charge-discharge cycle characteristics such as capacity retention ratio are enhanced and which is suitable for use in a lithium ion secondary cell or the like, and there is a need for a secondary cell using such a negative electrode.

The present inventors have discovered that the deterioration of a secondary cell generated attendant on the expansion of the negative electrode at the time of charging can be considerably suppressed by using a negative electrode current collector having an anisotropy in the arrangement of lumpy projections formed at the surface thereof and by appropriately designing the structure of the secondary cell.

According to one embodiment, there is provided a negative electrode wherein a negative electrode current collector has a conductive foil including a conductive substrate and a multiplicity of conductive lumpy projections provided at a surface of the substrate. The multiplicity of lumpy projections are so disposed that a plurality of the lumpy projections are aligned substantially in one direction to form a lumpy projection row and that a plurality of the lumpy projection rows are arrayed side by side at a predetermined interval in a direction substantially orthogonal to the one direction.

According to another embodiment, there is provided a secondary cell including a positive electrode, an electrolyte, and the above-mentioned negative electrode, wherein a region capable of accommodating the negative electrode extending at the time of charging is provided at a side part of the negative electrode in the direction in which the lumpy projection rows are arrayed side by side.

In the negative electrode according to an embodiment, the negative electrode current collector has the conductive foil including a conductive substrate and a multiplicity of conductive lumpy projections provided at a surface of the substrate. The properties of the conductive foil formed with the lumpy projections at its surface vary considerably depending on the manner in which the lumpy projections are arranged.

For example, in the conductive foil in which the lumpy projections are arranged at random, lamination of a silicon (elemental silicon) layer thereon results in that the lumpy bodies of silicon constituting the silicon layer are also arranged at random. Therefore, stresses generated by expansion of the silicon layer at the time of charging are isotropically exerted in every direction on the conductive film. Accordingly, when the stresses exceed a limit endurable for the conductive foil, various portions of the conductive foil tend to simultaneously extend in various directions. Meanwhile, the overall size of the electrode is limited by an outer package or the like, and extension (elongation) of the conductive foil is also limited. As a result of these factors, the conductive foil undergoes a wrinkle-like deformation at the time of charging, whereby the electrode structure is broken, and the cycle characteristics are lowered.

On the other hand, in the conductive foil constituting the negative electrode based on the present application, the multiplicity of lumpy projections are so arranged that a plurality of the lumpy projections are aligned substantially in one direction to form a lumpy projection row and that a plurality of the lumpy projection rows are arrayed side by side at a predetermined interval in a direction substantially orthogonal to the one direction. Therefore, the stress resistance of the conductive film in the one direction differs from the stress resistance in the array direction substantially orthogonal to the one direction. More specifically, the stress resistance in the array direction is lower than the stress resistance in the one direction. When stresses in the vicinity to a limit are exerted on the conductive foil due to the expansion of the silicon layer at the time of charging, therefore, extension (elongation) of the conductive foil in the array direction takes place first. This reduces the energy of strains, whereby the stresses are lowered, so that extension (elongation) of the conductive foil in the one direction is less liable to take place. Accordingly, the conductive foil and the negative electrode based on the present application only undergo extension (elongation) merely in the array direction at the time of charging, and there is little possibility of a deformation leading to breakage of cell structure, such as wrinkling. As a result, the negative electrode based on the present application promises an enhanced first-time discharge capacity and enhanced charge-discharge cycle characteristics.

It is to be noted here, however, that a region capable of accommodating the negative electrode undergoing extension (elongation) in the array direction at the time of charging should be provided in the inside of the secondary cell, in order to make the most of the characteristics of the negative electrode based on the present application. The region may be a gaseous-phase space, or may be a region filled with a liquid or semi-solid gel, such as the liquid electrolyte. In the secondary cell based on the present application, the region capable of accommodating the negative electrode undergoing extension (elongation) at the time of charging is provided at a side part of the negative electrode in the direction in which the lumpy projection rows are arrayed side by side; therefore, the requirement condition is satisfied. Accordingly, the characteristics of the negative electrode based on the present application are exhibited. Specifically, at the time of charging, the conductive foil and the negative electrode undergo extension (elongation) in the array direction, whereby stresses are relaxed, and a deformation leading to breakage of cell structure is prevented from occurring. As a result, the first-time discharge capacity and charge-discharge cycle characteristics of the secondary cell are enhanced.

Additional features and advantages are described herein, and will be apparent from, the following Detailed Description and the figures.

BRIEF DESCRIPTION OF THE FIGURES

FIGS. 5A and 5B are a perspective view (5A) and a sectional view (5B) showing another configuration (angular type) of the lithium ion secondary cell according to an embodiment;

DETAILED DESCRIPTION

Figure 1A:
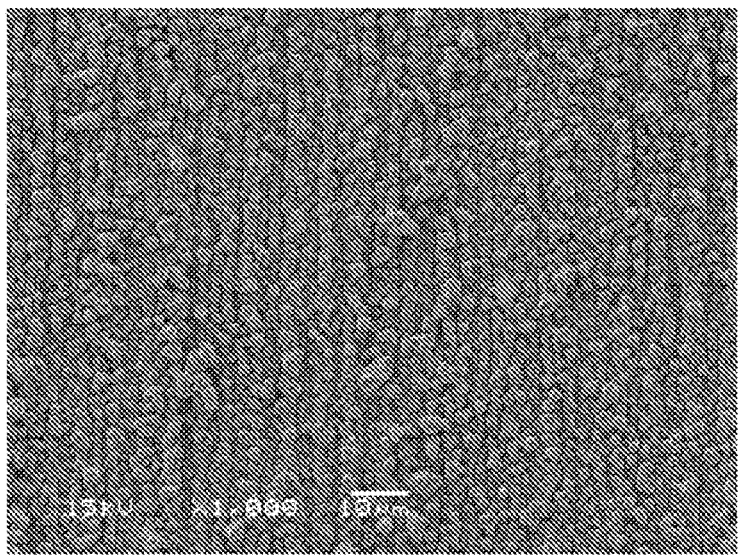
FIGS. 1A and 1B are representations of scanning electron microphotographs of the surface of an electrolytic copper foil used in an embodiment and the surface of a silicon layer formed thereon.

In the negative electrode according to an embodiment, the conductive foil is preferably an electrolytic copper foil in which a multiplicity of copper particulates serving as the multiplicity of lumpy projections are formed by an electrolytic treatment so as to cover substantially the whole part of a surface of an untreated copper foil serving as the substrate.

In this case, the lumpy projection rows are preferably arrayed side by side at a pitch of 1.3 to 2.8 µm. In addition, the electrolytic copper foil preferably has a surface roughness in terms of ten-point mean roughness Rz of not less than 1.5 µm. This promises enhanced adhesion between the negative electrode active material layer and the negative electrode current collector. On the other hand, the Rz value is preferably not more than 5 µm. If the surface roughness is too great, the negative electrode current collector may be easily cracked attendantly on expansion of the negative electrode active material layer. Incidentally, the surface roughness Rz is the ten-point mean roughness as specified in JIS B0601 (this applies hereinafter). Incidentally, it suffices that the surface roughness Rz of the region, where the negative electrode active material layer is provided, of the negative electrode current collector is within the above-mentioned range.

Besides, the negative electrode active material layer is preferably formed to have a surface shape reflecting the shape of the lumpy projections of the negative electrode current collector. It is known that when a silicon layer or the like is formed on the negative electrode current collector having the lumpy projections, such as an electrolytic copper foil, a negative electrode active layer comprised of a multiplicity of lumpy bodies or columnar bodies is formed. In this case, for example, if a negative electrode active material layer in an integrally connected plate-like form is formed, strains generated at locations in the negative electrode active material layer are transmitted through the negative electrode active material layer to be concentrated at a small number of locations, and the stresses at the locations become very high, possibly resulting in breakage of the negative electrode active material layer or, in the worst case, breakage of the negative electrode current collector. On the other hand, where the negative electrode active material layer is divided into a multiplicity of lumpy bodies or columnar bodies, the strains generated at locations in the negative electrode active material layer are locally dissipated in deformation of the lumpy bodies or columnar bodies, resulting in a lowered possibility of breakage of the negative electrode active material layer or breakage of the negative electrode current collector. Thus, the formation of the negative electrode active material layer as a collection (set) of many lumpy bodies or columnar bodies is indispensable to relaxation of stress.

In addition, the negative electrode active material layer is preferably formed by a vapor phase process and/or a sintering process.

Besides, the negative electrode active material layer preferably contains elemental silicon or a silicon compound as an ingredient. When silicon or the like is used as a negative electrode active material, it is possible to obtain a lithium ion secondary cell or the like with an enhanced capacity. In the case of an electrode structure according to the related art, however, the expansion attendant on charging may cause breakage of the electrode structure, thereby lowering the charge-discharge cycle characteristics. The negative electrode based on the present application can be applied most effectively to such a negative electrode active material.

In this case, preferably, the negative electrode active material layer contains oxygen as an ingredient, and the oxygen content is 3 to 40 at %. With oxygen contained in the negative electrode active material layer, expansion of the negative electrode active material is restrained, whereby the cycle characteristics can be enhanced effectively. With an oxygen-containing component made to be present in the atmosphere in forming the negative electrode active material layer, the negative electrode active material is oxidized during, in intermission of, or after the formation of the layer, whereby a layer containing an oxide of the active material can be formed in the negative electrode active material layer or at the surface of the negative electrode active material layer.

Furthermore, the negative electrode active material layer preferably has a high oxygen concentration layer high in oxygen concentration and a low oxygen concentration layer low in oxygen concentration, in the thickness direction of the negative electrode active material layer. While the effect of oxygen is obtained also where oxygen is contained evenly in the negative electrode active material layer, the effect is augmented when the high oxygen concentration layer and the low oxygen concentration are formed in a belt-like form.

In the secondary cell according to an embodiment, preferably, the positive electrode and the negative electrode are rolled in an overlapping condition to form a rolled electrode body, and the roll axis direction of the rolled electrode body is a direction intersecting the one direction along which each of the lumpy projection rows is formed. In the rolled electrode body, generally, the extension (elongation) of the electrode is possible only in the roll axis direction of the rolled electrode body. With the above-mentioned configuration, taking the extension (elongation) of the negative electrode in the above-mentioned array direction as a vector, the vector is so selected as to have a component in the roll axis direction. Therefore, the conductive foil can extend (be elongated) in the roll axis direction, whereby deformation such as to cause breakage of the electrode structure is prevented, and the first-run discharge capacity and the charge-discharge cycle characteristics are enhanced. In this case, it is most preferable for the roll axis direction coincides with the direction in which the lumpy projection rows are arrayed side by side, i.e., the direction in which the conductive film extends.

In addition, preferably, the outer package accommodating the rolled electrode body is of a tubular type, and a space is present between the outer package and a spacer provided on the side of leading out the positive electrode and the negative electrode in the rolled electrode body. The space functions as the above-mentioned region for accommodating the negative electrode extending in the roll axis direction of the rolled electrode body at the time of charging. The tubular shape may be a cylindrical shape or a tubular shape with a polygonal section (angular type).

In this case, preferably, the outer package is composed mainly of iron or an iron alloy. It is preferable to use a rigid material as the material of the outer package to thereby inhibit the secondary cell from being deformed in other directions than the roll axis direction, in order to assuredly obtain the effects of embodiment.

Besides, in the secondary cell according to an embodiment, the electrolyte preferably contains a fluorine-containing compound in which a part or the whole part of hydrogen in a cyclic carbonic acid ester or chain carbonic acid ester is replaced by fluorine. In this case, preferably, the fluorine-containing compound is difluoroethylene carbonate. This ensures enhanced cycle characteristics. Further, it is preferable, for example, to configure a lithium ion secondary cell by use of lithium hexafluorophosphate as an electrolyte salt.

Now, an embodiment will be described in detail below, referring to the drawings.

In this embodiment, an example in which a lithium ion secondary cell is configured by use of an electrolytic copper foil as the conductive foil will be described. In the electrolytic copper foil, copper particulates serving as the lumpy projections are formed at the surface of the copper foil, a plurality of the lumpy projections are aligned in the above-mentioned one direction to form the lumpy projection row.

Figure 1B:
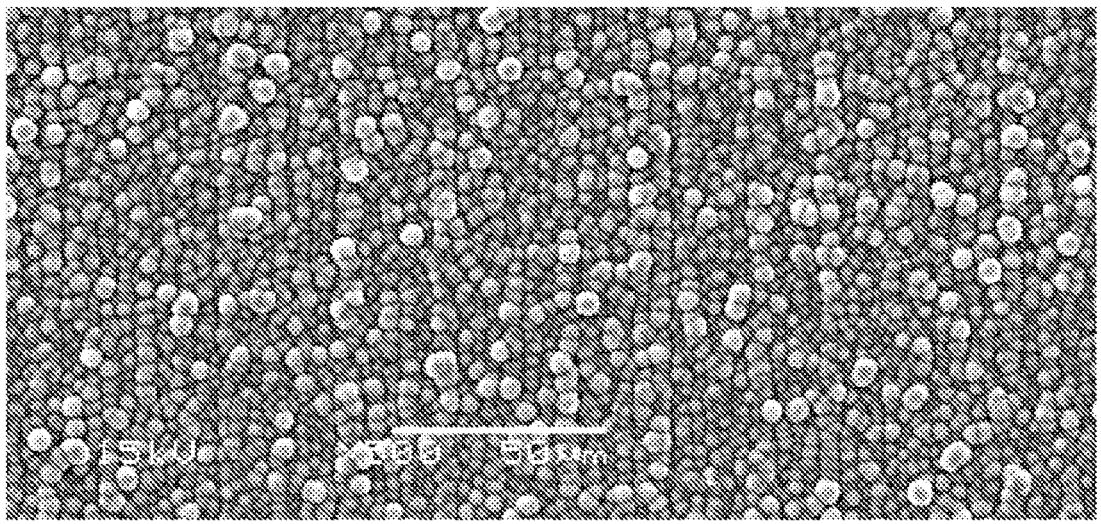
Figure 7A:
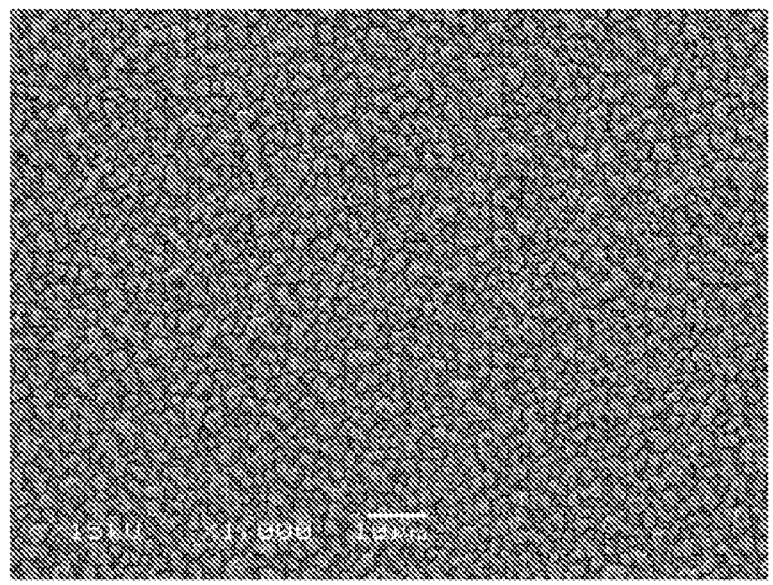
FIGS. 7A and 7B are representations of scanning electron microphotographs of the surface of a general electrolytic copper foil and the surface of a silicon layer formed thereon, according to a related art.
Figure 7B:
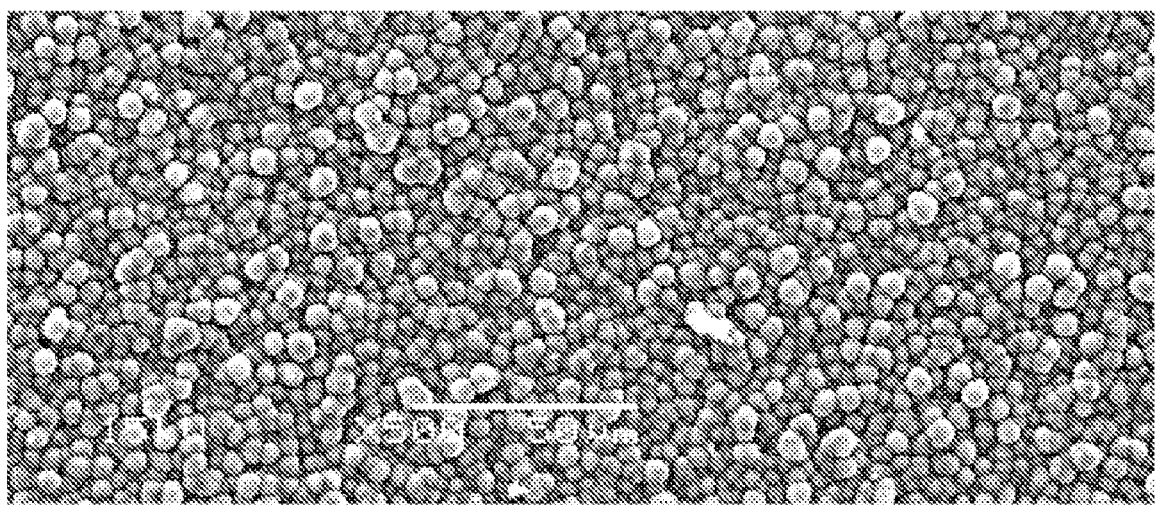

FIGS. 1A and 1B are representations of scanning electron microphotographs of the surface of an electrolytic copper foil used in this embodiment and the surface of a silicon layer formed thereon. On the other hand, FIGS. 7A and 7B are representations of scanning electron microphotographs of the surface of a general electrolytic copper foil and the surface of a silicon layer formed thereon, according to a related art.

Now, the method of fabricating the electrolytic copper foil will be described (refer to Japanese Patent Laid-open No. 2004-263296). In general, the method of producing an electrolytic copper foil includes two steps. In the first step, an untreated copper foil is prepared, and in the second step, the surface of the untreated copper foil is subjected to a surface treatment.

In the first step, an electrolytic tank having a rotary drum form cathode and a semi-cylindrical anode disposed concentrically with the cathode is used, and electrolysis is conducted while passing a copper plating solution between the electrodes. In this case, the cathode is rotated at a fixed speed, a copper foil is deposited in a predetermined thickness on the cathode, and thereafter the copper foil is continuously peeled off, to produce a long copper foil. Herein, this copper foil is referred to as "untreated copper foil".

In the second step, in order to impart a predetermined surface performance to the surface of the untreated copper foil, the untreated copper foil is passed through an electrolytic solution in the electrolytic tank, and during this passage, an electrochemical treatment is conducted with the untreated copper foil itself as a cathode, whereby one of various plating layers is formed on the surface of the untreated copper foil. In the present application, as the surface treatment, copper particulates are formed as lumpy projections at the surface of the untreated copper foil, with the result of surface roughening. In this case, for example, first, the copper particulates are grown as lumpy projections at the surface of the untreated copper foil by "burn plating" in which electrolysis is conducted in the vicinity of a critical current density. Subsequently, the whole surface of the copper foil is covered with a thin copper plating layer by "covering plating" in which ordinary electrolysis is conducted below the critical current density, whereby the copper particulates are prevented from scaling off. Herein, a series of these treatments is referred to as "roughening treatment".

In general, the relationships of the electrolytic voltage and current density in electrolytic deposition of copper with the structure of the copper layer deposited are classified as follows.

<A> Where the electrolytic voltage is extremely low, copper is not deposited, or, even if copper is deposited, a dense copper layer is not formed.

<B> As the electrolytic voltage is raised, a copper layer composed of copper crystallites having a polygonal crystal grain shape is deposited, with the crystal grains being finer as the electrolytic voltage is higher.

<C> When the electrolytic voltage is raised further, the crystals deposited form a columnar structure or a further elongated fibrous structure in which they are formed in the state of being distorted in the direction of passage of the current.

<D> When the electrolytic voltage is raised beyond a critical voltage, the crystals deposited form a rough dendritic structure or a dark red colored rough deposited layer without metallic luster, i.e., a burnt plating layer.

For ordinary uses, the copper layers deposited in <B> or <C> are good copper plating layers, and the copper layer deposited in <D> is a defective plating layer which arises from the so-called burn and which cannot be used as an ordinary copper plating layer. However, the formation of the burnt plating layer in <D> was found to be useful as a means for enhancing adhesion strength between the copper foil surface and a resin substrate or the like (refer to Japanese Patent Laid-open No. Sho 40-15327), and has been being generally used as a surface treatment method for a printed wiring board copper foil. There is an apparent boundary, in terms of both electrolytic phenomenon and surface appearance, between the cases of <B> and <C> and the case of <D>, and the current density at the time of electrolysis corresponding to the boundary is referred to as "critical current density".

As the electroplating solution in forming the burnt plating layer, for example, a sulfuric acid acidic copper sulfate solution may be used. In order to form copper particulates as rigid lumpy projections, it is preferable for the electroplating solution to contain an appropriate amount of at least one of molybdenum, iron, cobalt, nickel and tungsten, or to contain an appropriate amount of at least one of selenium, tellurium, arsenic, antimony and bismuth, and it is preferable to conduct the plating at appropriate current density and electrolytic temperature corresponding to the composition of the plating solution.

In addition, the manner in which the copper particulates in the form of lumpy projections are adhered to the untreated copper foil by the burn plating, i.e., the surface structure of the electrolytic copper foil, is heavily influenced by the surface structure of the untreated copper foil. For example, in the case where the surface of the untreated copper foil is comparatively flat, an electrolytic copper foil in which lumpy projections are disposed at random, as shown in FIG. 7A, is obtained. In this case, if the surface roughness of the untreated copper foil is high, the surface roughness of the electrolytic copper foil after the roughening treatment would also be high.

On the other hand, when the untreated copper foil is prepared by adding active sulfur such as thiourea to the copper plating solution, it is possible to provide the surface of the untreated copper foil with fixedly oriented belt-like patterns of ridges (mounts) and furrows (valleys) regularly at substantially fixed intervals. The distance between the peaks of the adjacent ridges (pitch) is ordinarily less than 5 μm, and the pitch decreased with a decrease in the current density at the time of forming the foil. When such an untreated copper foil is subjected to the roughening treatment, the copper particulates as the lumpy projections are electrolytically deposited in the manner of being concentrated in the areas of the crests of the ridges and are not deposited in the areas of the furrows. In this manner, the arrangement of lumpy projections as shown in FIG. 1A is obtained. In this case, during the electrolytic treatment, the copper particulates are gradually grown starting from lattice points aligned on the crests of the ridges. In this process of growth, the growth rate is high while the grain diameter is smaller than the distance between the lattice points. However, when the grain diameter becomes comparable to the distance between the lattice points, the copper particulates aligned in the longitudinal direction of the ridges abut on each other, whereon the growth rate of the copper particulates is markedly lowered. When the growth of the copper particulates is stopped in this condition, the electrolytic copper foil as shown in FIG. 1A is obtained.

In this electrolytic copper foil, the diameters of the lumpy projections are well concentrated on a value approximate to the distance between the lattice points aligned in the vertical direction in FIG. 1A. In addition, the lumpy projections are aligned, substantially without any gap therebetween, in a row along the vertical direction in the figure. On the other hand, the pitch of the ridges in the horizontal direction in the figure is slightly larger than the diameter of the lumpy projections, so that there are gaps between the lumpy projections in the horizontal direction. Therefore, the lumpy projections in the electrolytic copper foil shown in FIG. 1A are so arranged that a plurality of the lumpy projections are aligned in row along the vertical direction corresponding to the above-mentioned one direction to form a lumpy projection row and that a plurality of the lumpy projection rows are arrayed side by side at a predetermined interval (pitch) in the horizontal direction in the figure. As a result, a periodic structure is obtained in which, as scanned in the horizontal direction in the figure, the lumpy projection rows (ridge positions) and the gaps therebetween (furrow positions) are alternately repeated.

Hereinafter, in expressing the surface structure of the electrolytic copper foil in which the lumpy projection rows oriented in the above-mentioned one direction are formed as shown in FIG. 1A, the direction (the vertical direction in the figure) which corresponds to the above-mentioned one direction and in which the lumpy projections are aligned in a lumpy projection row may sometimes be referred to simply as "the row direction (of the lumpy projection rows)", and the direction (the horizontal direction in the figure) which is orthogonal to the row direction and in which the plurality of lumpy projection rows are arrayed side by side may sometimes be referred to simply as "the array direction (of the lumpy projection rows)".

Now, a case where the electrolytic copper foil as above is used as a negative electrode current collector, a silicon layer or the like is formed thereon as a negative electrode active material layer having a high capacity and the assembly is used as a negative electrode in a lithium ion secondary cell will be considered in the following.

In the electrolytic copper foil in which the lumpy projections are disposed at random as shown in FIG. 7A, the arrangement of lumpy bodies of silicon constituting the silicon layer formed thereon is also at random as shown in FIG. 7B. Therefore, the stresses due to expansion of the silicon layer at the time of charging are isotropically exerted, i.e., exerted in the same manner in all directions in the electrolytic copper foil. Accordingly, although the electrolytic copper foil endures the stress at the time of charging until the stress exceeds a limit, all parts of the electrolytic copper foil would simultaneously extend in various directions when the stress exceeds the limit endurable for the foil. Meanwhile, the overall size of the electrode is usually limited by an outer package or the like. As a result of these factors, the electrolytic copper foil extending (being elongated) in various directions at the time of charging is deformed in a wrinkled manner, whereby the electrode structure is broken, and the cycle characteristics are lowered.

On the other hand, in the electrolytic copper foil in which the lumpy projection rows are formed along the above-mentioned one direction as shown in FIG. 1A, the stress resistance in the row direction and that in the array direction are different from each other; specifically, the stress resistance in the direction in which the lumpy projection rows are arrayed side by side is lower than the stress resistance in the row direction of the lumpy projection rows. Therefore, when a stress near the limit is exerted on the electrolytic copper foil due to expansion of the silicon layer at the time of charging, extension (elongation) in the array direction takes place first. This ensures that the strain energy is reduced, and the stress is lowered, so that deformation in the row direction is less liable to occur. As a result, the electrolytic copper foil and the negative electrode having the electrolytic copper foil as a negative electrode current collector would extend only in the array direction at the time of charging, and there is low possibility of deformation leading to breakage of the electrode structure, such as deformation in a wrinkling manner. Thus, the first-time discharge capacity and the charge-discharge cycle characteristics are enhanced.

It is to be noted here, however, that in order to make the most of the above-mentioned characteristics, the lithium ion secondary cell should have such a structure as not to hamper extension (elongation) of the electrolytic copper foil and the negative electrode. Specifically, the lithium ion secondary cell should have a region which accommodate the electrolytic copper foil and the negative electrode which extend, without causing generation of high stresses, in the direction in which the electrolytic copper foil and the negative electrode extend (are elongated).

Figure 2A:
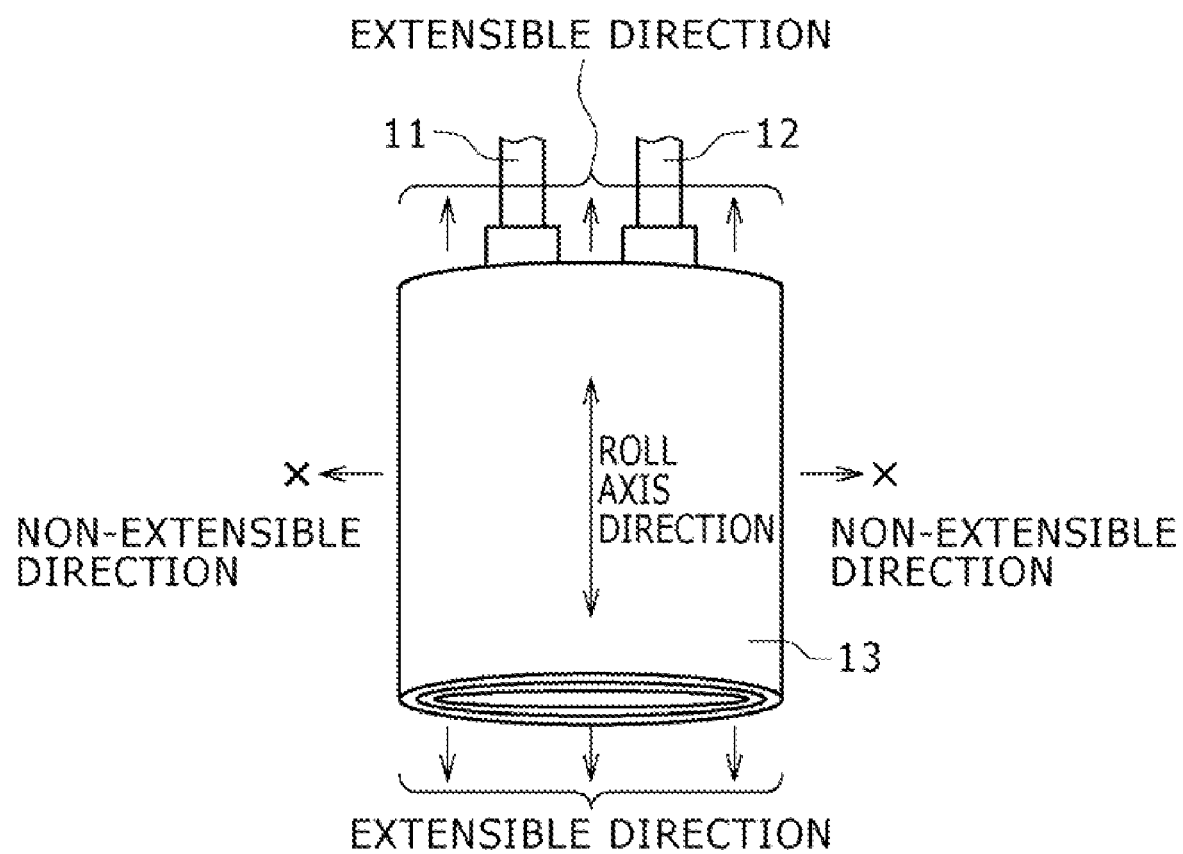
FIGS. 2A to 2C illustrate the relationship between the roll axis direction of a rolled electrode body and the extending direction of a negative electrode according to an embodiment.
Figure 2B:
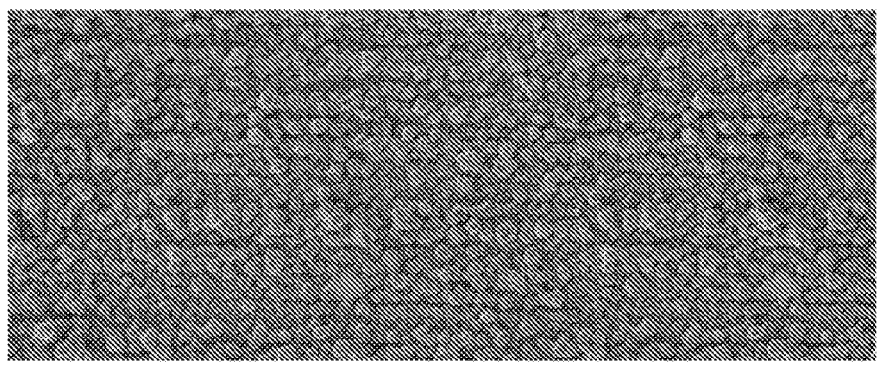
Figure 2C:
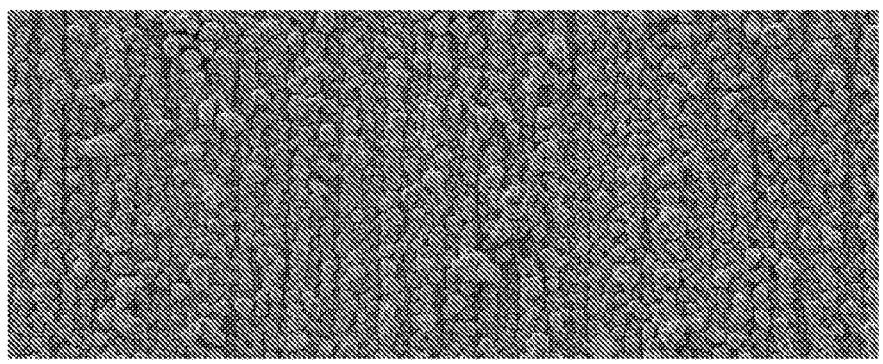

For example, in a secondary cell in which a long positive electrode and a long negative electrode overlapping with each other are rolled with their minor edge direction as a roll axis direction to form a rolled electrode body 13 as shown in FIGS. 2A to 2C, the extension (elongation) of the electrode is possible only in the roll axis direction of the rolled electrode body 13. Therefore, it is the most preferable to select the roll axis direction of the rolled electrode body 13 so as to coincide with the extending direction of the electrolytic copper foil, i.e., the array direction of the lumpy projection rows as shown in FIG. 2B. Even where this configuration is impossible for some reason, taking the extension (elongation) of the negative electrode in the array direction as a vector the vector should be so selected as to have a component in the roll axis direction; in other words, the roll axis direction should intersect the row direction of the lumpy projection rows (the above-mentioned one direction). This permits extension (elongation) of the electrolytic copper foil in the roll axis direction, so that the electrolytic copper foil extends in the array direction at the time of charging, as above-mentioned, whereby deformation such as to lead to breakage of the electrode structure is prevented from occurring, and the first-time discharge capacity and the charge-discharge cycle characteristics are enhanced.

On the other hand, when the roll axis direction of the rolled electrode body 13 is selected to be a direction orthogonal to the array direction as shown in FIG. 2C, the characteristic effects of the negative electrode based on an embodiment cannot be obtained.

While the secondary cell of the rolled type has been described in the above example, the structure of the secondary cell based on this embodiment is not particularly limited; for example, a stack type in which negative electrodes and positive electrodes are stacked with separators sandwiched therebetween or the like type can also be adopted. In that case, a region capable of accommodating the negative electrode extending at the time of charging is provided at a side part of the negative electrode in the direction in which the lumpy projection rows are arrayed side by side. The region may be a simple space, or may be filled with a liquid electrolyte. It is to be noted here, however, in the secondary cell of the rolled type in which long electrodes are rolled together with a separator, the effects of the embodiment is exhibited especially remarkably, for the above-mentioned reasons.

The shape of the secondary cell may be a cylindrical shape, as widely used at present for notebook type personal computers (PCs) and the like, or an angular type (tubular shape with polygonal section), as used mainly for portable phones and the like. The secondary cell based on an embodiment is applicable also to other shapes, without any particular limitation. It should be noted here, for example, that the effects of the embodiment is particularly greatly exhibited in the angular type or substantially angular type in which a change in the volume of the negative electrode is liable to influence on an increase in the thickness of the cell.

The outer package of the secondary cell as above may be any of aluminum can, stainless steel can, laminate film and the like commonly used hitherto. Preferably, use is made of an outer can composed mainly of iron, which is higher in strength and capable of restraining a change in the volume of the cell. It is to be noted here, however, that this preference depends on the extent of expansion/contraction of the negative electrode due to, for example, the content of silicon or the like in the active material layer; thus, the outer package is not particularly limited.

Figure 3:
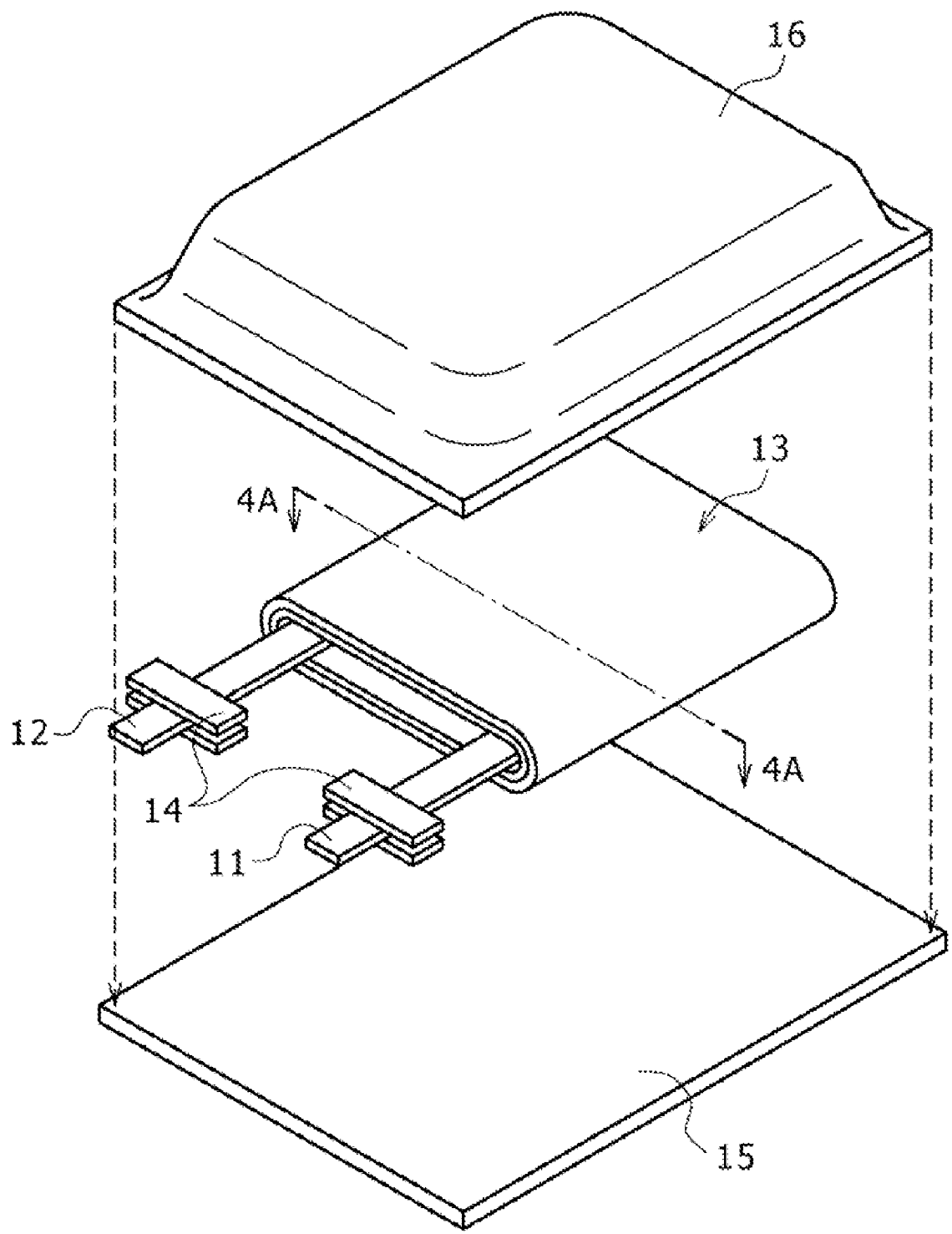
FIG. 3 is an exploded perspective view showing a configuration example (laminate type) of a lithium ion secondary cell according to an embodiment.

FIG. 3 is an exploded perspective view showing a configuration example of a lithium ion secondary cell based on this embodiment. As shown in FIG. 3, the secondary cell 10 is a laminate type cell, wherein a rolled electrode body 13 fitted with a negative electrode lead terminal 11 and a positive electrode lead terminal 12 is contained in the inside of an outer case composed of film form outer packages 15 and 16, and this configuration permits reductions in size, weight and thickness of the cell.

The negative electrode lead terminal 11 and the positive electrode lead terminal 12 extend from the inside of the outer packages 15 and 16 to the exterior, and are led out, for example, in the same direction. The lead terminals 11 and 12 are formed of a metallic material such as aluminum (Al), copper (Cu), nickel (Ni) and a stainless steel, and is formed in a sheet-like or net-like shape.

The outer packages 15 and 16 are each composed, for example, of an aluminum laminate film in which a nylon film, an aluminum foil and a polyethylene film are laminated with each other in this order. The outer package 15 is formed in a rectangular shape, whereas the outer package 16 is formed to be shallow inverse trapezoid in sectional shape, and is provided with an outer edge portion. The outer packages 15 and 16 are adhered to each other at their outer edge portions by welding or by adhesion using an adhesive, to form an outer case. The outer packages 15 and 16 are so disposed that, for example, the polyethylene film side thereof faces the rolled electrode body 13.

A close contact films 14 for preventing penetration of the outside air are inserted between the outer packages 15, 16 and the lead terminals 11, 12. The close contact films 14 are formed of a material which shows a close contact property to the lead terminals 11, 12, for example, a polyolefin resin such as polyethylene, polypropylene, modified polyethylene, and modified polypropylene.

Incidentally, the outer packages 15 and 16 may each be composed of a laminate film having other structure than the above-mentioned, a film of a polymer such as polypropylene, or a metallic film, in place of the above-mentioned aluminum laminate film.

Figure 4:
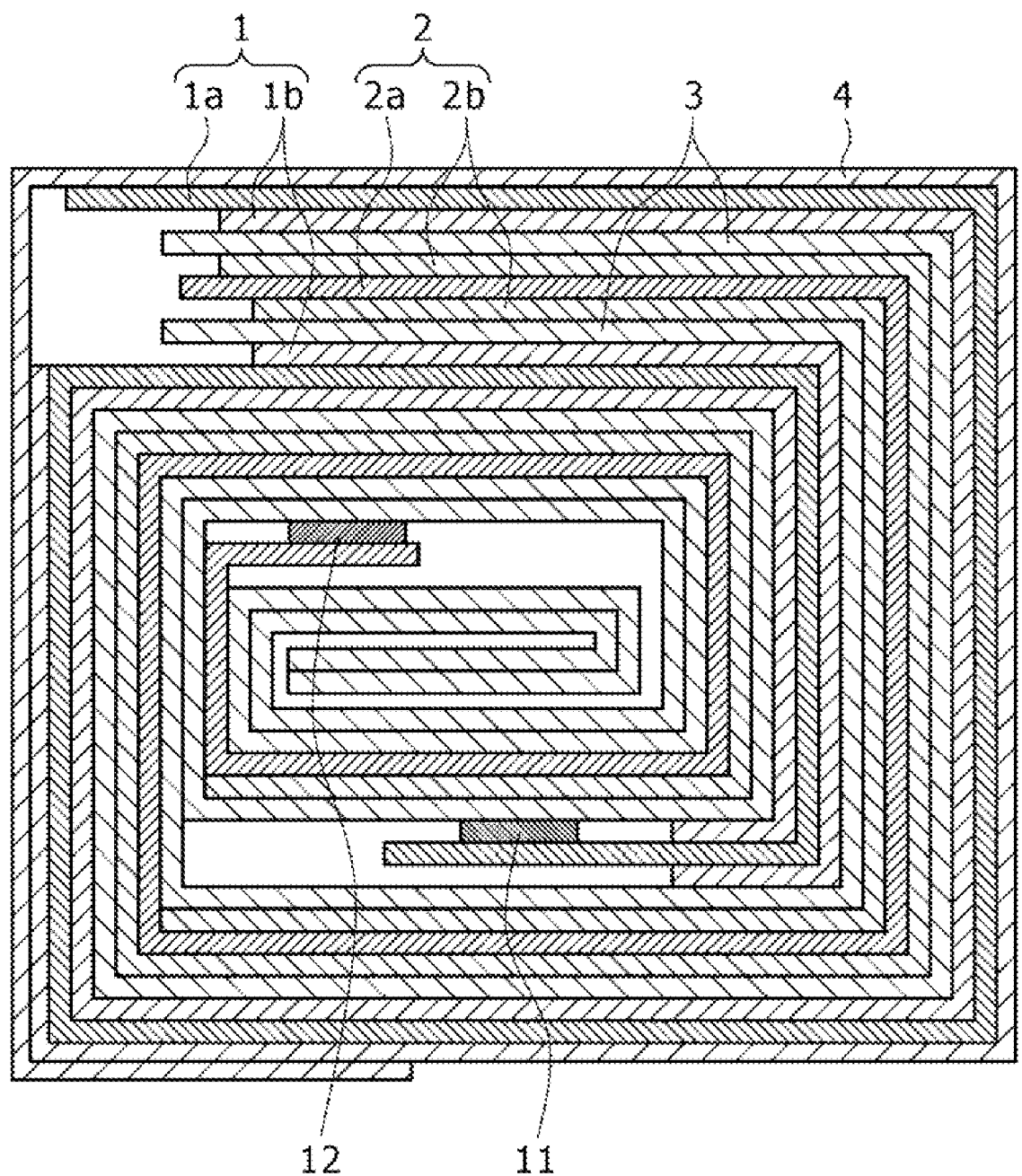
FIG. 4 is a sectional view taken along line 4A-4A of FIG. 3.

FIG. 4 shows a sectional structure of the rolled electrode body 13 at the position indicated by line 4A-4A of FIG. 3. The rolled electrode body 13 is a rolled body obtained by rolling a negative electrode 1 and a positive electrode 2 disposed to face each other with a separator (and an electrolyte layer) 3 sandwiched therebetween, and an outermost peripheral portion thereof is protected with a protective tape 4.

FIGS. 5A and 5B are a perspective view (5A) and a sectional view (5B) showing another configuration example of the lithium ion secondary cell based on this embodiment. As shown in FIG. 5, the secondary cell 20 is an angular type cell, wherein a rolled electrode body 23 is contained inside a cell can 24, which is filled with a liquid electrolyte. An opening portion of the cell can 24 is sealed with a cell cap 25. The rolled electrode body 23 is obtained by opposing a belt-like negative electrode 1 and a belt-like positive electrode 2 to each other with a separator (and an electrolyte layer) 3 sandwiched therebetween, and rolling them in their longitudinal direction. A negative electrode lead terminal 21 led out from the negative electrode 1 is connected to the cell can 24, which functions also as a negative electrode terminal. A positive electrode lead terminal 22 led out from the positive electrode 2 is connected to a positive electrode terminal 26.

Examples of the material which can be used to form the cell can 24 and the cell cap 25 include iron and aluminum. It is to be noted here, however, that where the cell can 24 and the cell cap 25 made of aluminum are used, a structure wherein the positive electrode lead terminal 22 is welded to the cell can 24 and the negative electrode lead terminal 21 is connected to a terminal pin 26 is preferably adopted, for the purpose of preventing a reaction between lithium and aluminum from occurring.

Figure 6A:
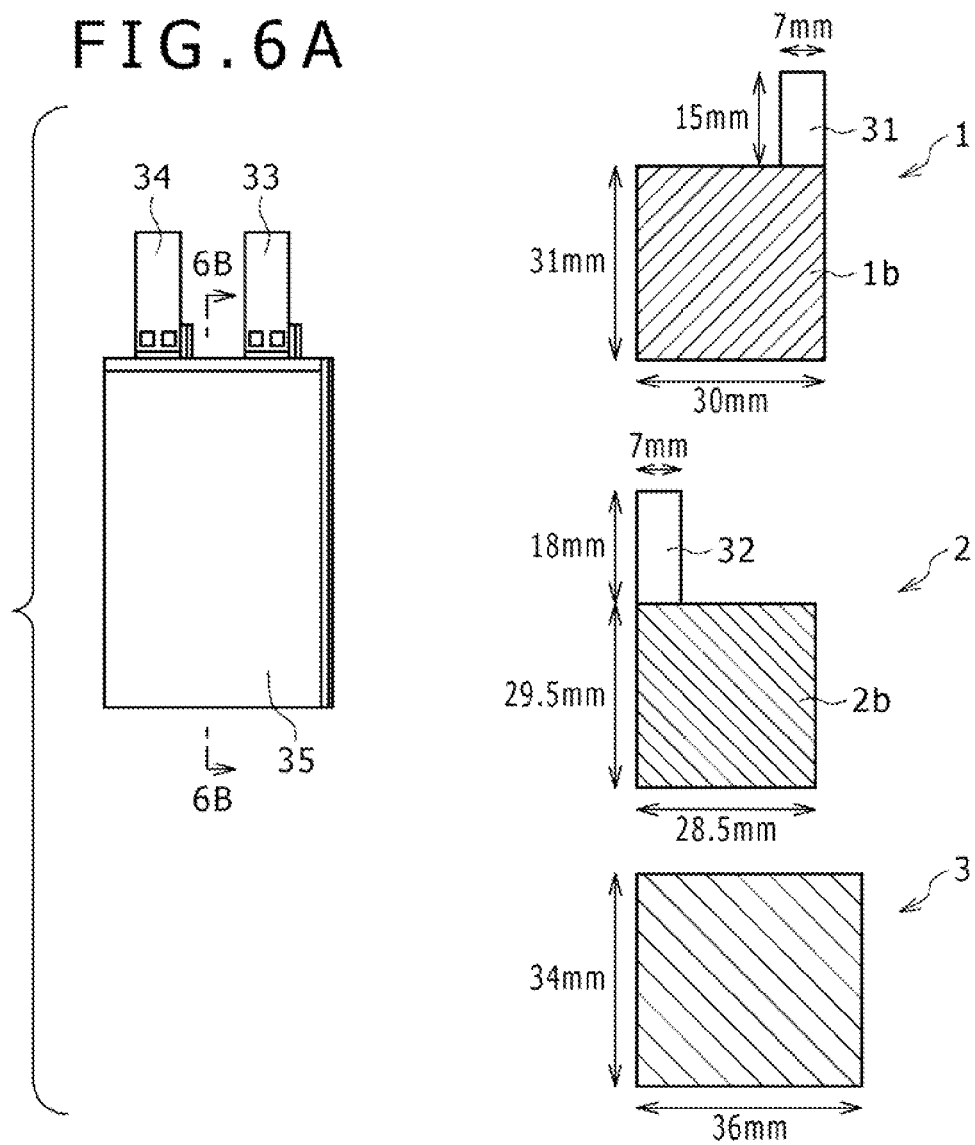
FIGS. 6A and 6B are illustrations (6A) and a sectional view (6B) showing a further configuration (coin type) of the lithium ion secondary cell according to an embodiment.
Figure 6B:
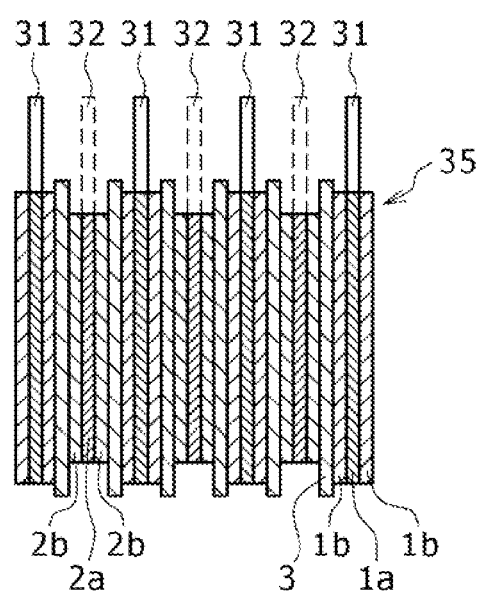

FIG. 6A shows illustrations of a further configuration example of the lithium ion secondary cell based on the present embodiment, and FIG. 6B is a sectional view taken along line 6B-6B of FIG. 6A. As shown in FIG. 6, the secondary cell is a stack type secondary cell, wherein for example, 30 mm×31 mm negative electrodes 1 and 28.5 mm×29.5 mm positive electrodes 2 are stacked, with separators therebetween which are slightly larger than the negative electrodes. The stack 35 is contained, together with a liquid electrolyte, in the inside of an outer package similar to the cell can 24 of the secondary cell 20 described above. A negative electrode current collector 1a and a positive electrode current collector 2a are provided respectively with tab connecting regions 31 and 32 where an active material layer is not formed; in these regions, the current collectors are connected to a negative electrode tab 33 (made of nickel, for example) and a positive electrode tab 34 (made of aluminum, for example), respectively.

Other members than the surface structure of the negative electrode current collector 1a are substantially the same as those in a lithium ion secondary cell according to the related art, but they will be described in detail below.

The negative electrode 1 includes the negative electrode current collector 1a, and a negative electrode active material layer 1b provided on the negative electrode current collector 1a.

The negative electrode current collector 1a is preferably formed from a metallic material which does not form an intermetallic compound with lithium (Li). If the negative electrode current collector 1a is formed from a material which forms an intermetallic compound with lithium, the negative electrode current collector 1a will expand and contract through reaction with lithium attendant on charging and discharging. As a result, structural breakage of the negative electrode current collector 1a occurs, whereby current collection performance is lowered. In addition, the ability to hold the negative electrode active material layer 1b is lowered, resulting in that the negative electrode active material layer 1b is liable to come off the negative electrode current collector 1a.

Examples of the metallic element which does not form an intermetallic compound with lithium include copper (Cu), nickel (Ni), titanium (Ti), iron (Fe) and chromium (Cr). The metallic material herein includes not only elemental metals but also alloys containing two or more metallic elements or containing at least one metallic element and at least one semimetallic element.

In addition, the negative electrode current collector 1a preferably includes a metallic material containing a metallic element which alloys with the negative electrode active material layer 1b. This ensures that the adhesion between the negative electrode active material layer 1b and the negative electrode current collector 1a is enhanced by alloying, and the negative electrode active material is restrained from being pulverized due to expansion and contraction attendant on charging and discharging, whereby the negative electrode active material layer 1b is restrained from coming off the negative electrode current collector 1a. Besides, an enhancing effect on electronic conductivity in the negative electrode 1 is also obtained.

The negative electrode current collector 1a may have a monolayer structure or a multilayer structure. In the case of the multilayer structure, preferably, the layer in contact with the negative electrode active material layer 1b includes a metallic material which alloys with silicon and an other layer includes a metallic material which does not form an intermetallic compound with lithium.

The surface, on which to provide the negative electrode active material layer 1b, of the negative electrode current collector 1a is roughened as above-mentioned, and, at the surface, the lumpy projection rows oriented in the above-mentioned one direction are arrayed side by side at a predetermined interval. The negative electrode current collector 1a preferably includes, for example, an electrolytic copper foil in which a multiplicity of copper particulates as a multiplicity of lumpy projections are formed so as to cover substantially the whole surface of an untreated copper foil by an electrolytic treatment. In this case, preferably, the lumpy projection rows are arrayed side by side at a pitch of 1.3 to 2.8 μm. In addition, preferably, the electrolytic copper foil has a surface roughness in terms of ten-point mean roughness Rz of 1.5 to 5 µm.

The negative electrode active material layer 1b contains at least one selected from the group consisting of elemental silicon, a silicon compound, elemental tin and a tin compound, as a negative electrode active material. Among these materials, particularly preferred is silicon. Silicon is excellent in ability to take in lithium ions through alloying and in ability to re-extract the alloyed lithium as lithium ions; therefore, where a lithium ion secondary cell is configured by use of silicon as the negative electrode active material, a high energy density can be realized. Silicon may be contained in an elemental form or may be contained in the form of an alloy or compound, or may further be contained as a mixture of two or more of these forms.

The negative electrode active material layer 1b may be of a coating type having a thickness of about 70 to 80 µm, or may be of a thin film type having a thickness of about 5 to 6 µm.

When being of the coating type, the negative electrode active material layer 1b is formed on the negative electrode current collector 1a by using particulates of a negative electrode active material including at least one of elemental silicon, a silicon compound, elemental tin and a tin compound, optionally accompanied by a conductive material, such as carbon material, and a binder such as polyimide and polyvinylidene fluoride.

When being of the thin film type, negative electrode active material layer 1b is formed on the negative electrode current collector 1a in the form of including at least one of elemental silicon, a silicon compound, elemental tin and a tin compound.

In this case, preferably, a part or the whole part of elemental silicon or elemental tin has been alloyed with the negative electrode current collector 1a constituting the negative electrode 1. This makes it possible to enhance the adhesion between the negative electrode active material layer 1b and the negative electrode current collector 1a, as above-mentioned. Specifically, it is preferable that the diffusion of a constituent element of the negative electrode current collector 1a into the negative electrode active material layer 1b, or the diffusion of a constituent element of the negative electrode active material layer 1b into the negative electrode current collector 1a, or both of the diffusions have occurred at the interface between the negative electrode current collector 1a and the negative electrode active material layer 1b. This restrains the negative electrode active material layer 1b from coming off the negative electrode current collector 1a, even upon expansion and contraction of the negative electrode active material layer 1b attendant on charging and discharging. Incidentally, in the present application, the just-mentioned diffusion of an element or elements is also included in various forms of alloying.

Where the negative electrode active material layer 1b contains elemental tin, a configuration may be adopted in which a cobalt layer is laminated on the tin layer, and these metallic elements are alloyed with each other by a heat treatment after the lamination. This promises enhanced charging and discharging efficiencies and enhanced cycle characteristics. The reason for these improvements has not yet been elucidated, but it is considered that the presence of cobalt, which does not react with lithium, enhances the structural stability of the tin layer upon repetition of charging and discharging reactions.

Where the negative electrode active material layer 1b contains elemental silicon, a metallic element which does not form an intermetallic compound with lithium but is alloyed with silicon in the negative electrode active material layer 1b may be used. Examples of such a metallic element include copper, nickel, and iron. Among these elements, copper is particularly preferred because when copper is used, it is possible to obtain a negative electrode current collector 1a having sufficient strength and conductivity.

In addition, it is preferable for the negative electrode active material layer 1b to contain oxygen as a constituent element thereof. Oxygen is able to suppress expansion and contraction of the negative electrode active material layer 1b, and is able to suppress lowering in discharge capacity and to suppress swelling. Preferably, the oxygen contained in the negative electrode active material layer 1b is at least partly bonded to silicon. The bonded state may be silicon monoxide or silicon dioxide, or may be other metastable state.

The content of oxygen in the negative electrode active material layer 1b is preferably in the range of 3 to 45 at %. If the oxygen content is less than 3 at %, the effect of containing of oxygen may be insufficient. On the other hand, if the oxygen content is in excess of 45 at %, the energy capacity of the cell would be lowered, and the resistance of the negative electrode active material layer 1b is increased. Besides, the negative electrode active material layer 1b may be swelled by local insertion of lithium, and the cycle characteristics of the cell would be lowered. Incidentally, the film formed on the surface of the negative electrode active material layer 1b through decomposition of the liquid electrolyte or the like upon charging and discharging is not included in the negative electrode active material layer 1b. Therefore, the oxygen content of the negative electrode active material layer 1b is a numerical value calculated while excluding the film.

Besides, the negative electrode active material layer 1b preferably has a structure in which first layers low in oxygen content and second layers higher than the first layers in oxygen content are alternately laminated and in which at least one second layer is present between the first layers. With this structure, expansion and contraction attendant on charging and discharging can be suppressed more effectively. For example, the content of silicon in the first layer is preferably not less than 90 at %. The first layer may or may not contain oxygen. Preferably, the first layer has a low oxygen content, and, more preferably, the first layer does not contain oxygen at all or contains only a trace amount of oxygen. Such a configuration makes it possible to obtain a higher discharge capacity. On the other hand, the second layer preferably has a silicon content of not more than 90 at % and an oxygen content of not less than 10 at %. This ensures that structural breakage due to expansion and contraction can be restrained more effectively. The first and second layers may be laminated in the order of the first layer and the second layer or in the order of the second layer and the first layer, from the side of the negative electrode current collector 1a. The surface of the negative electrode active material layer 1b may be composed of the first layer or the second layer. In addition, the oxygen content is preferably varied stepwise or continuously between the first layer and the second layer. If the oxygen content varies abruptly, the diffusivity of lithium ions may be lowered, resulting in a rise in resistance.

Incidentally, the negative electrode active material layer 1b may contain at least one constituent element other than silicon and oxygen. Examples of the other constituent element include cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), and chromium (Cr).

The positive electrode 2 includes a positive electrode current collector 2a and a positive electrode active material layer 2b provided on the positive electrode current collector 2a.

The positive electrode current collector 2a preferably includes a metallic material, for example, aluminum, nickel or stainless steel.

The positive electrode active material layer 2b preferably contains, for example, at least one material that is able to extract lithium ions at the time of charging and to insert lithium ions at the time of discharging, as a positive electrode active material, optionally accompanied by a conductive material, such as carbon material, and a binder such as polyvinylidene fluoride.

Preferable examples of the material which is able to extract and insert lithium ions include lithium-transition metal compound oxides including lithium and a transition metal element or elements M, represented by the general formula $Li_xMO_2$. When a lithium ion secondary cell is fabricated by use of a lithium-transition metal compound oxide, a high electromotive force can be generated. In addition, since the lithium-transition metal compound oxide is high in density, a further enhancement of the capacity of the secondary cell can be realized. Incidentally, M in the above general formula represents at least one transition metal, a preferable example of which is at least one of cobalt and nickel. In the formula, x represents a number which varies depending on the charged state (discharged state) of the cell and is usually in the range of $0.05 \leq x \leq 1.10$. Specific examples of the lithium-transition metal compound oxide as above include $LiCoO_2$ and $LiNiO_2$.

Incidentally, where a particulate lithium-transition metal compound oxide is used as the positive electrode active material, the powder of the oxide may be used as it is. Alternatively, a surface layer containing at least one selected from the group consisting of an oxide different from the lithium-transition metal compound oxide in composition, a halide, a phosphate, and a sulfate may be provided at least at part of the particulate lithium-transition metal compound oxide. Such a surface layer makes it possible to enhance the stability of the positive electrode active material and to further suppress a lowering in discharge capacity. In this case, the constituent element(s) of the surface layer and the constituent element(s) of the lithium-transition metal compound oxide may have diffused mutually.

In addition, the positive electrode active material layer 2b preferably contains at least one selected from the group consisting of Group 2, Group 3 and Group 4 elements in the long periodic table in their elemental state and compounds thereof. Each of these elements and compounds thereof is able to enhance stability and to further suppress the lowering in discharge capacity. Examples of the Group 2 elements include magnesium (Mg), calcium (Ca) and strontium (Sr), among which magnesium is preferred. Examples of the Group 3 elements include scandium (Sc) and yttrium (Y), among which yttrium is preferred. Examples of the Group 4 elements include titanium and zirconium (Zr), among which zirconium is preferred. These elements may be solid dissolved in the positive electrode active material, or may be present in elemental state or as compound in the grain boundaries of the positive electrode active material.

The separator 3 is for isolating the negative electrode 1 and the positive electrode 2 from each other, thereby preventing shortcircuit of current from occurring due to contact of both the electrodes, and for passing lithium ions therethrough. Examples of the material which can be used to form the separator 3 include thin films of microporous polyethylene and polypropylene provided with a multiplicity of micropores.

The liquid electrolyte include, for example, a solvent and an electrolyte salt dissolved in the solvent, and may optionally contain an additive or additives.

Examples of the solvent in the liquid electrolyte include nonaqueous solvents such as cyclic carbonic acid esters such as 1,3-dioxolan-2-one (ethylene carbonate; EC), 4-methyl-1,3-dioxolan-2-one (propylene carbonate; PC), etc. and chain carbonic acid esters such as dimethyl carbonate (DMC), diethyl carbonate (DEC), ethyl methyl carbonate (EMC), etc. These solvents may be used singly, but they are preferably used in mixture of at least two of them. For example, a mixture of a high dielectric constant solvent such as ethylene carbonate, propylene carbonate, etc. and a low viscosity solvent such as dimethyl carbonate, diethyl carbonate, ethyl methyl carbonate, etc. may be used, whereby a high solubility therein of the electrolyte salt and a high ionic conductivity can be realized.

Besides, the solvent may contain a sultone. When a sultone is contained in the solvent, stability of the liquid electrolyte is enhanced, and the cell can be restrained from being swelled due to a decomposition reaction or the like. Of various sultones, preferable are those having an unsaturated bond or bonds in its ring, and particularly preferable is 1,3-propenesultone represented by the following chemical formula 1, which makes it possible to obtain higher effects.

(Chemical formula 1)

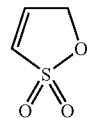

Besides, a cyclic carbonic acid ester having an unsaturated bond, such as 1,3-dioxol-2-one (vinylene carbonate; VC) and 4-vinyl-1,3-dioxolan-2-one (VEC) is preferably used in mixture in the solvent. Such a mixture is able to further suppress the lowering in discharge capacity. Especially preferable is the use of VC and VEC together, whereby furthermore high effects can be obtained.

Furthermore, a carbonic acid ester derivative having a halogen atom may be used in mixture in the solvent, whereby the lowering in discharge capacity can be suppressed. In this case, the derivative is used preferably in mixture with a cyclic carbonic acid ester having an unsaturated bond, whereby furthermore high effects can be obtained. The carbonic acid ester derivative having a halogen atom may be a cyclic compound or a chain compound, but the cyclic compound is preferred because it gives furthermore high effects. Examples of the cyclic compound include 4-fluoro-1,3-dioxolan-2-one (FEC), 4-chloro-1,3-dioxolan-2-one, 4-bromo-1,3-dioxolan-2-one, and 4,5-difluoro-1,3-dioxolan-2-one (DFEC). Among these cyclic compounds, preferred are DFEC and FEC, which have a fluorine atom, and particularly preferred is DFEC, whereby furthermore high effects can be obtained.

Examples of the electrolyte salt in the liquid electrolyte include lithium salts such as lithium hexafluorophosphate ($LiPF_6$) and lithium tetrafluoroborate ($LiBF_4$). The electrolyte salts may be used either singly or in mixture of at least two of them.

Incidentally, the liquid electrolyte may be used as it is, or may be used in the form of a so-called gelled electrolyte by supporting it on a polymer compound. In this case, the electrolyte may be in the state of impregnating the separator 3 therewith, or may be present in a laminar form between the separator 3 and the negative electrode 1 or the positive electrode 2. Preferable examples of the polymer material are polymers which contain vinylidene fluoride, since they are high in oxidation-reduction stability. As the polymer compound, those which are formed by polymerization of a polymerizable compound are also preferable. Examples of the polymerizable compound include monofunctional acrylates such as acrylic acid esters, etc., monofunctional methacrylates such as methacrylic acid esters, etc., polyfunctional acrylates such as diacrylic acid esters, triacrylic acid esters, etc., polyfunctional methacrylates such as dimethacrylic acid esters, trimethacrylic acid esters, etc., acrylonitrile, and methacrylonitrile. Among these polymerizable compounds, esters having an acrylate group or a methacrylate group are preferred, because they promise ready progress of polymerization and a high reactivity thereof.

The lithium ion secondary cell 10 can be manufactured, for example, as follows.

First, a negative electrode active material layer 1b is formed on a negative electrode current collector 1a, to produce a negative electrode 1.

In the case of forming a negative electrode active material layer 1b of the coating type, for example, first, a negative electrode active material containing at least one selected from the group consisting of elemental silicon, a silicon compound, elemental tin and a tin compound is pulverized into a particulate material, which is optionally admixed with a conductive material and a binder, to prepare a composition. Next, the composition is dispersed in a dispersant such as N-methylpyrrolidone (NMP) to form a slurry, the compound slurry is applied to a negative electrode current collector 1a, then the dispersant is evaporated off, and compression molding is conducted, to fabricate a negative electrode 1.

In the case of forming a negative electrode active material layer 1b of the thin film type, first, the negative electrode active material layer 1b containing elemental silicon, a silicon compound or the like is formed on a negative electrode current collector 1a by, for example, a vapor phase process, a sintering process or a liquid phase process. Examples of the vapor phase process include physical deposition and chemical deposition, and specifically, vacuum deposition, sputtering, ion plating, laser ablation, CVD (Chemical Vapor Deposition), and thermal spraying. Examples of the liquid phase process include plating. Two or more of these processes may be used together, and, further, other method may also be used in combination therewith, to form the negative electrode active material layer 1b.

In the case where the negative electrode active material layer 1b is made to contain oxygen, the oxygen content is controlled, for example, by containing oxygen in the atmosphere in which to form the negative electrode active material layer 1b, by containing oxygen in the atmosphere during baking or during a heat treatment, or by regulating the oxygen content of the negative electrode active material particles used to from the negative electrode active material layer 1b.

Besides, in the case where a negative electrode active material layer 1b is formed by alternately laminating first layers having a low oxygen content and second layers higher than the first layers in oxygen content as above-mentioned, the oxygen content of the negative electrode active material layer 1b may be controlled by varying the concentration of oxygen in the atmosphere; alternatively, the first layer may be formed and then the surface thereof may be oxidized to form the second layer.

Incidentally, after the negative electrode active material layer 1b is formed, a heat treatment may be conducted in a vacuum or in a non-oxidizing atmosphere so that alloying at the interface between the negative electrode current collector 1a and the negative electrode active material layer 1b proceeds further.

Subsequently, a positive electrode active material layer 2b is formed on a positive electrode current collector 2a. For example, a positive electrode active material is admixed optionally with a conductive material and a binder to prepare a composition, which is dispersed in a dispersant such as NMP to form a slurry, and the composition slurry is applied to the positive electrode current collector 2a, followed by compression molding, to produce a positive electrode 2.

Next, a negative electrode lead terminal 11 and a positive electrode lead terminal 12 are attached respectively to the negative electrode 1 and the positive electrode 2. Subsequently, the negative electrode 1 and the positive electrode 2 are faced to each other with a separator 3 sandwiched therebetween, the resulting assembly is rolled with the minor edge direction as the roll axis direction, and a protective tape 37 is adhered to an outermost peripheral part of the resulting roll, to form a rolled electrode body 13. In this case, the negative electrode 1 and the positive electrode 2 are so disposed that the negative electrode active material layer 1b and the positive electrode active material layer 2b face each other. Thereafter, for example, the rolled electrode body 13 is clamped between outer packages 15 and 16, and outer edge portions of the outer packages 15 and 16 are adhered to each other by fusing or the like, to achieve sealing. In this case, close contact films 14 are inserted between the lead terminals 11, 12 and the outer packages 15, 16. In this manner, a laminate type lithium ion secondary cell 10 is assembled.

In addition, in the case where a liquid electrolyte is supported by a polymer compound, a vessel composed of an outer package such as a laminate film is fed with a polymerizable compound together with a liquid electrolyte, and the polymerizable compound is polymerized in the vessel, to convert the electrolyte into a gelled form. Besides, a metallic can may be used as the vessel, for the purpose of coping with large expansion and contraction of electrodes. In addition, before rolling the negative electrode 1 and the positive electrode 2, the negative electrode 1 and/or the positive electrode 2 may be coated with a gelled electrolyte by a coating process or the like, then the negative electrode 1 and the positive electrode 2 with a separator 3 sandwiched therebetween may be rolled.

After the assemblage, the lithium ion secondary cell 10 is charged, whereon lithium ions are extracted from the positive electrode 2, they migrate through the liquid electrolyte to the negative electrode 1 side, where they are reduced, and the resulting lithium forms an alloy with the negative electrode active material, thereby being taken into the negative electrode 1. When discharging is conducted, the lithium having been taken into the negative electrode 1 is extracted as lithium ions, which migrate through the liquid electrolyte to the positive electrode 2 side, where they are inserted into the positive electrode 2.

In this case, the lithium ion secondary cell 10 can exhibit an enhanced capacity, since elemental silicon or a silicon compound or the like is contained as a negative electrode active material in the negative electrode active material layer 1b. Moreover, since the electrolytic copper foil in which lumpy projection rows are oriented in one direction is used as the negative electrode current collector, the first-time discharge capacity and the charge-discharge cycle characteristics such as capacity retention ratio are enhanced.

EXAMPLES

Now, specific examples of the embodiment will be described in detail below. Incidentally, in the following description of examples, the symbols used in the embodiments above will be directly used in the manner of corresponding to the above.

Example 1

In Example 1, lithium ion secondary cells 10 of the rolled type corresponding to the above embodiment were fabricated, with the roll axis direction and the surface roughness Rz varied, the cells were subjected to charging and discharging, and the increase rate (%) of thickness upon charging, the capacity retention ratio (%) and the like were measured.

<Fabrication of Negative Electrode 1>

In Example 1, an electrolytic copper foil having lumpy projection rows oriented in one direction was used as a negative electrode current collector 1a. A vacuum deposition process using 99% pure silicon (elemental silicon) as a raw material and using a deflection type electron beam vapor source was conducted while causing a tiny amount of oxygen to flow in a chamber, to form a 5 µm-thick partly oxidized amorphous silicon layer as a negative electrode active material layer 1b on the electrolytic copper foil. The substantial film formation rate in this instance was 100 nm/s. Scanning electron microphotographs of the electrolytic copper foil and the silicon layer formed thereon have been shown in FIGS. 1A and 1B.

The electrode structure obtained as above was heat treated in an argon atmosphere at 280° C. for 6 hr, and then a negative electrode lead terminal 11 was attached thereto, to form a negative electrode 1 for testing. In the case of further increasing the oxygen content of the silicon layer, it is recommendable to spraying a liquid oxygen-containing compound into the chamber through a nozzle, in the manner of blowing the mist of the compound to the stream of the material undergoing vapor deposition.

<Fabrication of Lithium Ion Secondary Cell 10>

Next, lithium cobalt oxide ($LiCoO_2$) as a positive electrode active material, carbon black as a conductive material, and polyvinylidene fluoride (PVdF) as a binder were mixed with each other to prepare a composition. The composition was dispersed in NMP used as a dispersant to form a slurry material. The composition slurry was applied to a positive electrode current collector 2a composed of an aluminum foil, then the dispersant was evaporated off to dry the composition, and compression molding was conducted, to form a positive electrode active material layer 2b. Thereafter, a positive electrode lead terminal 12 was attached, to form a positive electrode 2.

Subsequently, the negative electrode 1 and the positive electrode 2 are faced to each other, with a separator 3 sandwiched therebetween, and the assembly was rolled to fabricate a rolled electrode body 13. The rolled electrode body 13 was clamped between outer packages 15 and 16, and outer edge portions of the outer packages 15 and 16 were adhered to each other by fusing, to achieve sealing. In this instance, close contact films 14 were inserted between the lead terminals 11, 12 and the outer packages 15, 16. In this manner, the laminate type lithium ion secondary cell 10 was assembled.

As the separator 3, there was used a 23 µm-thick multilayer separator having a structure in which a film composed mainly of microporous polyethylene was used as a center material, which was sandwiched between films composed mainly of microporous polypropylene.

In addition, a solution prepared by dissolving 1 mol/dm³ of $LiPF_6$ as an electrolyte salt in a mixed solvent obtained by mixing 4,5-difluoro-1,3-dioxolan-2-one (DFEC), ethylene carbonate (EC) and diethyl carbonate (DEC) in a weight ratio DFEC:EC:DEC=5:25:70 was used as a standard liquid electrolyte.

Incidentally, in Examples 1-1 to 1-4, an electrolytic copper foil in which the array direction of lumpy projection rows intersects the roll axis direction at 45 degrees was used as the negative electrode current collector. In Examples 1-5 to 1-10, an electrolytic copper foil in which the array direction of lumpy projection rows is parallel to (coincides with) the roll axis direction was used as the negative electrode current collector.

Comparative Example 1

In Comparative Examples 1-1 and 1-2, an untreated copper foil not provided with any lumpy projection was used as the negative electrode current collector; in Comparative Examples 1-3 to 1-5, an electrolytic copper foil having lumpy projections disposed at random was used as the negative electrode current collector. In Comparative Examples 1-6 to 1-11, an electrolytic copper foil in which the array direction of lumpy projection rows is orthogonal to the roll axis direction was used as the negative electrode current collector. Secondary cells 11 were fabricated in the same manner as in Example 1, except for the just-mentioned factors.

<Evaluation of Lithium Ion Secondary Cells>

For each of the secondary cells 10 fabricated in Example 1 and Comparative Example 1, a cycle test was conducted, and capacity retention ratio was measured. One cycle in the cycle test comprised charging at a fixed current density of 3 mA/cm² until a cell voltage of 4.2 V is reached, subsequently charging at a fixed voltage of 4.2 V until the current density becomes 0.3 mAWcm², and thereafter discharging at a fixed current density of 3 mA/cm² until the cell voltage is lowered to 2.5 V. Such charge-discharge cycle was conducted 100 times (100 cycles) at room temperature, and the capacity retention ratio upon the 100th cycle, defined by the following formula:

Capacity retention ratio on 100th cycle (%)=[(Discharge capacity in 100th cycle)/(Discharge capacity in 1st cycle)]×100(%)

was examined. The results are shown, together with the increase rate of thickness on charging, in Tables 1-1 to 1-4.

TABLE 1-1

| | Acive material | Method of film formation | Surface structure of copper foil and relationship between array direction of projection rows and rows and roll axis direction | Rz (µm) | Increase rate in thickness on charging (%) | Capacity retention ratio (%) |
|---|---|---|---|---|---|---|
| Comp. Ex. 1-1 | Si | Vapor deposition | No Projection | 1 | 25.3 | 15 |
| Comp. Ex. 1-2 | Si | Vapor deposition | No Projection | 2 | 24.6 | 19 |

TABLE 1-1-continued

| | Acive material | Method of film formation | Surface structure of copper foil and relationship between array direction of projection rows and rows and roll axis direction | Rz (μm) | Increase rate in thickness on charging (%) | Capacity retention ratio (%) |
|---|---|---|---|---|---|---|
| Comp. Ex. 1-3 | Si | Vapor deposition | Projections at random | 3 | 23.2 | 36 |
| Comp. Ex. 1-4 | Si | Vapor deposition | Projections at random | 4 | 22.6 | 40 |
| Comp. Ex. 1-5 | Si | Vapor deposition | Projections at random | 5 | 24.1 | 42 |

TABLE 1-2

| | Acive material | Method of film formation | Surface structure of copper foil and relationship between array direction of projection rows and rows and roll axis direction | Rz (μm) | Increase rate in thickness on charging (%) | Capacity retention ratio (%) |
|---|---|---|---|---|---|---|
| Comp. Ex. 1-6 | Si | Vapor deposition | Array direction is orthogonal to roll axis direction | 1 | 22.1 | 41 |
| Comp. Ex. 1-7 | Si | Vapor deposition | Array direction is orthogonal to roll axis direction | 1.5 | 21.9 | 43 |
| Comp. Ex. 1-8 | Si | Vapor deposition | Array direction is orthogonal to roll axis direction | 3 | 21.8 | 45 |
| Comp. Ex. 1-9 | Si | Vapor deposition | Array direction is orthogonal to roll axis direction | 4 | 22.0 | 47 |
| Comp. Ex. 1-10 | Si | Vapor deposition | Array direction is orthogonal to roll axis direction | 5 | 21.1 | 48 |
| Comp. Ex. 1-11 | Si | Vapor deposition | Array direction is orthogonal to roll axis direction | 5.5 | 20.9 | 42 |

TABLE 1-3

| | Acive material | Method of film formation | Surface structure of copper foil and relationship between array direction of projection rows and rows and roll axis direction | Rz (μm) | Increase rate in thickness on charging (%) | Capacity retention ratio (%) |
|---|---|---|---|---|---|---|
| Ex. 1-1 | Si | Vapor deposition | Array direction is at 45 degrees against roll axis direction | 1.5 | 11.5 | 52 |
| Ex. 1-2 | Si | Vapor deposition | Array direction is at 45 degrees against roll axis direction | 3 | 11.6 | 55 |
| Ex. 1-3 | Si | Vapor deposition | Array direction is at 45 degrees against roll axis direction | 4 | 11.2 | 58 |
| Ex. 1-4 | Si | Vapor deposition | Array direction is at 45 degrees against roll axis direction | 5 | 11.0 | 57 |

TABLE 1-4

| | Acive material | Method of film formation | Surface structure of copper foil and relationship between array direction of projection rows and rows and roll axis direction | Rz (μm) | Increase rate in thickness on charging (%) | Capacity retention ratio (%) |
|---|---|---|---|---|---|---|
| Ex. 1-5 | Si | Vapor deposition | Array direction is parallel to roll axis direction | 1 | 4.2 | 81 |
| Ex. 1-6 | Si | Vapor deposition | Array direction is parallel to roll axis direction | 1.5 | 4.3 | 83 |
| Ex. 1-7 | Si | Vapor deposition | Array direction is parallel to roll axis direction | 3 | 4.1 | 85 |
| Ex. 1-8 | Si | Vapor deposition | Array direction is parallel to roll axis direction | 4 | 4.2 | 88 |
| Ex. 1-9 | Si | Vapor deposition | Array direction is parallel to roll axis direction | 5 | 4.2 | 88 |
| Ex. 1-10 | Si | Vapor deposition | Array direction is parallel to roll axis direction | 5.5 | 4.1 | 82 |

Incidentally, the thickness of the electrolytic copper foil was 18 μm in every example. As shown in the tables, the ten-point mean roughness values Rz of the copper foils were as follows:

Untreated copper foils with no lumpy projectins . . . Rz=1, 2

Electrolytic copper foils with lumpy projections at random . . . Rz=3, 4, 5

Electrolytic copper foils with lumpy projections in rows . . . Rz=1, 1.5, 3, 4, 5, 5.5

In addition, the increase rate of thickness on charging is defined by the following formula:

Increase rate of thickness on charging (%)=[($B-A$)/$A$]×100(%)

where A is the thickness of the secondary cell upon assemblage, and B is the thickness of the secondary cell upon the first-time charging.

As shown in Tables 1-1 to 1-4, in Comparative Examples 1-1 and 1-2 in which the untreated copper foils without any lumpy projection was used, the increase rate of thickness on charging was high, and the adhesion between the negative electrode current collector 1a and the negative electrode active material layer 1b was insufficient, so that the negative electrode active material would scale off upon repetition of charging and discharging, and the capacity retention ratio was very poor. In Comparative Examples 1-3 to 1-5 in which the electrolytic copper foil with lumpy projections disposed at random was used, the increase rate of thickness on charging was slightly reduced and the capacity retention ratio was a little improved, as compared with Comparative Examples 1-1 and 1-2. In Comparative Examples 1-6 to 1-11 in which the electrolytic copper foil with the array direction of the lumpy projection rows being orthogonal to the roll axis direction was used, the increase rate of thickness on charging and the capacity retention ratio were little changed (were substantially not changed), as compared with Comparative Examples 1-3 to 1-5 in which the electrolytic copper foil with lumpy projections disposed at random was used.

In comparison to these comparative examples, in Examples 1-1 to 1-4 in which the electrolytic copper foil with the array direction of lumpy projection rows intersecting the roll axis direction at 45 degrees was used, the increase rate of thickness on charging was slightly moderated, and the cycle characteristics were enhanced accordingly. However, the improvements are not sufficient. In Examples 1-5 to 1-10 in which the electrolytic copper foil with the array direction of lumpy projection rows coinciding with the roll axis direction was used, the increase rate of thickness on charging was remarkably improved, and the cycle characteristics were much enhanced accordingly.

Besides, as shown in Table 1-4, the ten-point mean roughness Rz is preferably in the range of 1.5 to 5 μm.

Example 2

In Example 2, electrolytic copper foils in which the array direction of lumpy projection rows coincides with the roll axis direction (like the electrolytic copper foil used in Example 1-8) and the ten-point mean roughness Rz is 4 μm but in which the pitch of the lumpy projection rows in the array direction was varied, were used. Secondary cells 10 were fabricated in the same manner as in Examples 1, except for the just-mentioned factors, and they were served to measurement of capacity retention ratio and the like. The results are shown in Table 2.

TABLE 2

|  | Acive material | Method of film formation | Surface structure of copper foil and relationship between array direction of projection rows and rows and roll axis direction | Increase rate in thickness on charging (%) | Capacity retention ratio (%) | Pitch (μm) |
| --- | --- | --- | --- | --- | --- | --- |
| Comp. Ex. 2 | Si | Vapor deposition | Array direction is parallel to roll axis direction | 22.6 | 40 | 0 |
| Ex. 2-1 | Si | Vapor deposition | Array direction is parallel to roll axis direction | 6.2 | 82 | 2.78 |
| Ex. 1-8 | Si | Vapor deposition | Array direction is parallel to roll axis direction | 4.2 | 88 | 2.27 |
| Ex. 2-2 | Si | Vapor deposition | Array direction is parallel to roll axis direction | 4.0 | 86 | 1.72 |
| Ex. 2-3 | Si | Vapor deposition | Array direction is parallel to roll axis direction | 3.9 | 81 | 1.49 |
| Ex. 2-4 | Si | Vapor deposition | Array direction is parallel to roll axis direction | 3.8 | 80 | 1.3 |

It is seen from Table 2 that the pitch of the lumpy projection rows in the array direction is preferably in the range of 1.3 to 2.8 μm.

Example 3

In Example 3, a negative electrode active material layer of the coating type was formed by use of particulate silicon with a mean particle diameter of 1 μm as a negative electrode active material. First, a silicon powder with a mean particle diameter of 1 μm was mixed with a polyimide (used as a binder) in a weight ratio of 9:1, and the mixture was admixed with NMP, followed by stirring, to prepare a slurry-formed negative electrode composition. The slurry was applied to a negative electrode current collector composed of an electrolytic copper foil. After the solvent was evaporated off to dry the applied slurry, the resulting coating film was rolled, and was heated in a vacuum at 220° C. for 12 hr, to form a sintered body. Thereafter, a negative electrode lead terminal 11 was attached, to produce a negative electrode 1 for testing.

Comparative Example 3

In Comparative Example 3, negative electrode active material layers of the coating type were formed by use of graphite as a negative electrode active material. First, mesophase carbon microbeads with a mean particle diameter of 25 μm, graphite, and polyvinylidene fluoride as a binder were mixed in a weight ratio of 87:3:10, and the resulting mixture was admixed with NMP, followed by stirring, to prepare a slurry-formed negative electrode composition. The slurry was applied to both sides of a negative electrode current collector composed of an electrolytic copper foil. After evaporating off the solvent to dry the composition, a negative electrode lead terminal was attached. In this manner, negative electrodes for testing were fabricated.

Secondary cells 10 were produced in the same manner as in Example 1, except for the just-mentioned factors, and they were served to measurement of capacity retention ratio and the like. The results are shown in Table 3.

TABLE 3

| | Acive material | Method of film formation | Surface structure of copper foil and relationship between array direction of projection rows and rows and roll axis direction | Rz (μm) | Increase rate in thickness on charging (%) | Capacity retention ratio (%) |
|---|---|---|---|---|---|---|
| Comp. Ex. 3-1 | Si | Coating | Projection at random | 4 | 18.5 | 41 |
| Comp. Ex. 3-2 | Si | Coating | Array direction is orthogonal to roll axis direction | 4 | 17.6 | 49 |
| Ex. 3 | Si | Coating | Array direction is parallel to roll axis direction | 4 | 2.5 | 82 |
| Comp. Ex. 3-3 | c | Coating | Projections at random | 4 | 0.7 | 89 |
| Comp. Ex. 3-4 | c | Coating | Array direction is orthogonal to roll axis direction | 4 | 0.7 | 90 |
| Comp. Ex. 3-5 | c | Coating | Array direction is parallel to roll axis direction | 4 | 0.7 | 89 |

Example 4

In Example 4, a film was formed by sputtering. A silicon layer was formed by an RF magnetron sputtering process using a 99.99% pure silicon target. In this case, the substantial film formation rate was 0.5 nm/s, and the thickness of the negative electrode active material layer of silicon thus formed was 4.5 μm. Secondary cells 10 were fabricated in the same manner as in Example 1, except for the just-mentioned factors, and the cells were served to measurement of capacity retention ratio and the like. The results are shown in Table 4.

TABLE 4

| | Acive material | Method of film formation | Surface structure of copper foil and relationship between array direction of projection rows and rows and roll axis direction | Rz (μm) | Increase rate in thickness on charging (%) | Capacity retention ratio (%) |
|---|---|---|---|---|---|---|
| Comp. Ex. 4-1 | Si | Sputtering | Projections at random | 4 | 24.5 | 40 |
| Comp. Ex. 4-2 | Si | Sputtering | Array direction is orthogonal to roll axis direction | 4 | 24.3 | 47 |
| Ex. 4 | Si | Sputtering | Array direction is parallel to roll axis direction | 4 | 4.3 | 84 |

Example 5

In Example 5, a silicon layer was formed by CVD. Specifically, silane ($SiH_4$) gas was used as a raw material, argon (Ar) was used as an exciting gas, and CVD was conducted at a film formation rate of 1.5 nm/s and a substrate temperature of 200° C. Secondary cells 10 were fabricated in the same manner as in Example 1, except for the just-mentioned factors, and the cells were served to measurement of capacity retention ratio and the like. The results are shown in Table 5.

TABLE 5

| | Acive material | Method of film formation | Surface structure of copper foil and relationship between array direction of projection rows and rows and roll axis direction | Rz (μm) | Increase rate in thickness on charging (%) | Capacity retention ratio (%) |
|---|---|---|---|---|---|---|
| Comp. Ex. 5-1 | Si | CVD | Projections at random | 4 | 24.1 | 39 |
| Comp. Ex. 5-2 | Si | CVD | Array direction is orthogonal to roll axis direction | 4 | 22.6 | 51 |
| Ex. 5 | Si | CVD | Array direction is parallel to roll axis direction | 4 | 4.0 | 88 |

From Examples 3 to 5, it was found out that any negative electrode that includes the negative electrode active material layer having a silicon layer produces the same effects as obtained in Example 1, irrespectively of the method of forming the silicon layer. In contrast, in the secondary cells including a negative electrode having a carbon-based negative electrode active material layer showing little expansion and contraction attendant on charging and discharging, as in Comparative Examples 3-3 to 3-5, the effects based on the present application could not be recognized.

Example 6

In Example 6, while using the same negative electrode as in Example 1-8, secondary cells using aluminum can or an iron can as the outer package and tubular type secondary cells using iron or an iron alloy as an outer package material were fabricated, and the cells were served to measurement of capacity retention ratio and the like. The results are shown in Table 6.

package may be of the tubular type, and that this configuration does not produce any change in secondary cells having a negative electrode including a carbon-based negative electrode active material layer but produces an effect if a silicon alloy based negative electrode is used.

Example 7

In Example 7, a secondary cell was fabricated in which the negative electrode formed in Example 1-8 was used, and a mixed solvent prepared by mixing EC and DEC in a weight ratio of EC:DEC=30:70 was used as the solvent constituting the liquid electrolyte, and the cell was served to measurement of capacity retention ratio upon the 100th cycle. The results are shown in Table 7.

TABLE 6

| | Acive material | Method of film formation | Surface structure of copper foil and relationship between array direction of projection rows and rows and roll axis direction | Increase rate in thickness on charging (%) | Capacity retention ratio (%) | Outer package |
|---|---|---|---|---|---|---|
| Ex. 1-8 | Si | Vapor deposition | Array direction is parallel to roll axis direction | 4.2 | 88 | Laminate |
| Ex. 6-1 | Si | Vapor deposition | Array direction is parallel to roll axis direction | 1.1 | 90.3 | Alminum |
| Ex. 6-2 | Si | Vapor deposition | Array direction is parallel to roll axis direction | 0.2 | 92.1 | Iron |
| Ex. 6-3 | Si | Vapor deposition | Array direction is parallel to roll axis direction | 0.2 | 82 | Tubular |
| Comp. Ex. 6-1 | Si | Vapor deposition | Array direction is Orthogonal to roll axis direction | 8.1 | 41 | Tubular |
| Comp. Ex. 6-2 | c | Vapor deposition | Array direction is Orthogonal to roll axis direction | 0.07 | 91 | Tubular |
| Comp. Ex. 6-3 | c | Vapor deposition | Array direction is parallel to roll axis direction | 0.07 | 90 | Tubular |

From Table 6, it was confirmed that cycle characteristics are enhanced by rather using an aluminum can or an iron can than using a laminate film as the outer package. This is considered to be attributable to a suppressing effect on the increase of thickness. It was also found out that the outer

TABLE 7

| | Acive material | Method of film formation | Surface structure of copper foil and relationship between array direction of projection rows and rows and roll axis direction | Increase rate in thickness on charging (%) | Capacity retention ratio (%) | Electrolyte |
|---|---|---|---|---|---|---|
| Ex. 1-8 | Si | Vapor deposition | Array direction is parallel to roll axis direction | 4.2 | 88 | DFEC:EC:DEC |
| Ex. 7 | Si | Vapor deposition | Array direction is parallel to roll axis direction | 4.3 | 55 | EC:DEC |

It is seen from Table 7 that capacity retention ratio is enhanced more in Example 1-8 using DFEC as a component of the solvent in the liquid electrolyte than in Example 7 not using DFEC.

Examples 8 and 9

In Example 8, negative electrodes were fabricated in the same manner as in Example 1-8, except that the quantity of the oxygen gas introduced into the chamber 2 in vapor depositing silicon was varied, to form partly oxidized amorphous silicon layers varying in oxygen content as negative electrode active material layers 1b. The oxygen content was measured by use of an energy dispersive X-ray fluorescence spectrometer (EDX). In Example 9-1, one half of a silicon layer was formed in the same manner as in Example 1-8, then oxygen gas was introduced into the chamber to oxidize the surface of the silicon layer, and thereafter the remaining half of the silicon layer was laminated, whereby a layer of a region with a raised oxygen concentration was introduced into the silicon layer. In Examples 9-2 to 9-4, the same operation as just-mentioned was repeated a plurality of times, whereby a plurality of layers of a region with a raised oxygen concentration were introduced into the silicon layer.

Secondary cells were fabricated in the same manner as in Example 1-8, except for the just-mentioned factors, and the cells were served to measurement of capacity retention ratio and the like. The results are shown in Tables 8 and 9.

TABLE 8

| | Acive material | Method of film formation | Surface structure of copper foil and relationship between array direction of projection rows and rows and roll axis direction | Increase rate in thickness on charging (%) | Capacity retention ratio (%) | Oxygen concentration (at %) |
|---|---|---|---|---|---|---|
| Ex. 8-1 | Si | Vapor deposition | Array direction is parallel to roll axis direction | 5.3 | 79 | 2 |
| Ex. 8-2 | Si | Vapor deposition | Array direction is parallel to roll axis direction | 4.3 | 84 | 3 |
| Ex. 1-8 | Si | Vapor deposition | Array direction is parallel to roll axis direction | 4.2 | 88 | 5 |
| Ex. 8-3 | Si | Vapor deposition | Array direction is parallel to roll axis direction | 4.0 | 89 | 10 |
| Ex. 8-4 | Si | Vapor deposition | Array direction is parallel to roll axis direction | 3.9 | 89 | 20 |
| Ex. 8-5 | Si | Vapor deposition | Array direction is parallel to roll axis direction | 3.8 | 88.5 | 30 |
| Ex. 8-6 | Si | Vapor deposition | Array direction is parallel to roll axis direction | 3.6 | 88 | 40 |
| Ex. 8-7 | Si | Vapor deposition | Array direction is parallel to roll axis direction | 3.6 | 81 | 50 |

TABLE 9

| | Acive material | Method of film formation | Surface structure of copper foil and relationship between array direction of projection rows and rows and roll axis direction | Increase rate in thickness on charging (%) | Capacity retention ratio (%) | Number of oxide belts |
|---|---|---|---|---|---|---|
| Ex. 1-8 | Si | Vapor deposition | Array direction is parallel to roll axis direction | 4.2 | 88 | 0 layers |
| Ex. 9-1 | Si | Vapor deposition | Array direction is parallel to roll axis direction | 4.1 | 88.2 | 1 layer |
| Ex. 9-2 | Si | Vapor deposition | Array direction is parallel to roll axis direction | 4.0 | 89 | 2 layers |
| Ex. 9-3 | Si | Vapor deposition | Array direction is parallel to roll axis direction | 3.9 | 89.2 | 3 layers |
| Ex. 9-4 | Si | Vapor deposition | Array direction is parallel to roll axis direction | 3.8 | 89.6 | 4 layers |
| Ex. 9-5 | Si | Vapor deposition | Array direction is parallel to roll axis direction | 3.6 | 90.1 | 5 layers |
| Ex. 9-6 | Si | Vapor deposition | Array direction is parallel to roll axis direction | 3.5 | 91 | 6 layers |
| Ex. 9-7 | Si | Vapor deposition | Array direction is parallel to roll axis direction | 3.3 | 90.5 | 7 layers |
| Ex. 9-8 | Si | Vapor deposition | Array direction is parallel to roll axis direction | 3.1 | 91.1 | 8 layers |

In Example 8, it was found out that in the case where the active material layer 1b contains oxygen, the increase rate of thickness on charging is reduced, and the capacity retention ratio was increased, both indicating improvements in cell characteristics. In Example 9, it was found out that in the case where a layer(s) high in oxygen content and a layer(s) low in oxygen content are laminated in the active material layer 1b, the increase rate of thickness on charging is reduced, and the capacity retention ratio is increased, both indicating improvements in cell characteristics.

While the present application has been described above by showing some embodiments and examples thereof, the application is not to be construed as limited to the embodiments and examples, and various modifications are possible within the scope of the application.

For example, while the cases of using a film formed outer material or the like as the outer package or using an angular can as the outer package have been described in the embodiments and examples above, the shape of the outer package in the present application may be any of various types, such as coin type, button type, thin type, and large type. Besides, the present application is applicable also to the stack type in which the negative and positive electrodes are stacked in pluralities of layers.

The secondary cell based on an embodiment, in which elemental silicon or tin or the like is used as a negative electrode active material, realizes a high energy capacity and good cycle characteristics, contributes to reductions in size, weight and thickness of mobile-type electronic apparatuses, and enhances the convenience in use of the apparatuses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A negative electrode, wherein:
a negative electrode current collector has a conductive foil including a conductive substrate and a multiplicity of conductive lumpy projections provided at a surface of said substrate; and
said multiplicity of lumpy projections are so disposed that a plurality of said lumpy projections are aligned substantially in one direction to form a lumpy projection row and that a plurality of said lumpy projection rows are arrayed side by side at a predetermined interval in a direction substantially orthogonal to said one direction.

2. The negative electrode as set forth in claim 1, wherein said conductive foil is an electrolytic copper foil wherein a multiplicity of copper particulates serving as said multiplicity of lumpy projections are formed by an electrolytic treatment so as to cover substantially the whole part of a surface of an untreated copper foil serving as said substrate.

3. The negative electrode as set forth in claim 2, wherein said lumpy projection rows are arrayed side by side at a pitch of 1.3 to 2.8 μm.

4. The negative electrode as set forth in claim 2, wherein said electrolytic copper foil has a surface roughness in terms of ten-point mean roughness Rz of 1.5 to 5 μm.

5. The negative electrode as set forth in claim 1, wherein a negative electrode active material layer is formed to have a surface shape reflecting the shape of said lumpy projections of said negative electrode current collector.

6. The negative electrode as set forth in claim 1, wherein a negative electrode active material layer is formed by a vapor phase process and/or a sintering process.

7. The negative electrode as set forth in claim 1, wherein a negative electrode active material layer contains elemental silicon or a silicon compound as an ingredient.

8. The negative electrode as set forth in claim 7, wherein said negative electrode active material layer contains oxygen as an ingredient, and the content of oxygen is 3 to 40 at %.

9. The negative electrode as set forth in claim 8, wherein said negative electrode active material layer has a high oxygen concentration layer high in oxygen concentration and a low oxygen concentration layer low in oxygen concentration, disposed in the thickness direction of said negative electrode active material layer.

10. A secondary cell comprising:
a positive electrode,
an electrolyte, and
a negative electrode as set forth in any one of claims 1 to 9,
wherein said negative electrode extends, in the direction in which said lumpy projection rows are arrayed side by side, during charging to form an extended negative electrode, and
wherein a region capable of accommodating said extended negative electrode is provided at a side of said negative electrode in the direction in which said negative electrode extends.

11. The secondary cell as set forth in claim 10, wherein said positive electrode and said negative electrode are rolled in an overlapping condition to form a rolled electrode body, and the roll axis direction of said rolled electrode body is a direction intersecting said one direction along which each said lumpy projection row is formed.

12. The secondary cell as set forth in claim 11, wherein said roll axis direction is said direction in which said lumpy projection rows are arrayed side by side.

13. The secondary cell as set forth in claim 11, wherein an outer package accommodating said rolled electrode body is of a tubular type, and a space is present between said outer package and a spacer provided on a side of the rolled electrode body in the roll axis direction.

14. The secondary cell as set forth in claim 13, wherein said outer package is composed mainly of iron or an iron alloy.

15. The secondary cell as set forth in claim 10, wherein said electrolyte contains a fluorine-containing compound in which a part or the whole part of hydrogen in a cyclic carbonic acid ester or chain carbonic acid ester is replaced by fluorine.

16. The secondary battery as set forth in claim 15, wherein said fluorine-containing compound is difluoroethylene carbonate.

* * * * *